(12) United States Patent
Uemura et al.

(10) Patent No.: US 8,939,007 B2
(45) Date of Patent: Jan. 27, 2015

(54) INERTIAL FORCE SENSOR AND ZERO POINT CORRECTION METHOD USED THEREIN

(75) Inventors: Takeshi Uemura, Osaka (JP); Isao Hattori, Fukui (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/006,084

(22) PCT Filed: Apr. 26, 2012

(86) PCT No.: PCT/JP2012/002851
§ 371 (c)(1),
(2), (4) Date: Sep. 18, 2013

(87) PCT Pub. No.: WO2012/147348
PCT Pub. Date: Nov. 1, 2012

(65) Prior Publication Data
US 2014/0007645 A1    Jan. 9, 2014

(30) Foreign Application Priority Data

Apr. 27, 2011  (JP) .................................. 2011-099183
May 12, 2011  (JP) .................................. 2011-106845

(51) Int. Cl.
| | | |
|---|---|---|
| G01P 21/00 | (2006.01) | |
| G01L 25/00 | (2006.01) | |
| G01C 19/5614 | (2012.01) | |
| G01C 19/5776 | (2012.01) | |

(52) U.S. Cl.
CPC ............ *G01L 25/00* (2013.01); *G01C 19/5614* (2013.01); *G01C 19/5776* (2013.01)
USPC ........................................................ 73/1.38

(58) Field of Classification Search
None
See application file for complete search history.

(56) References Cited

U.S. PATENT DOCUMENTS

| | | |
|---|---|---|
| 6,198,275 B1 | 3/2001 | Wolf et al. |
| 6,584,841 B1 | 7/2003 | Ichinose et al. |

(Continued)

FOREIGN PATENT DOCUMENTS

| | | |
|---|---|---|
| JP | 05-207356 A | 8/1993 |
| JP | 06-294652 A | 10/1994 |

(Continued)

OTHER PUBLICATIONS

International Search Report issued in PCT/JP2012/002851 with Date of mailing Jul. 3, 2012.

*Primary Examiner* — Robert R Raevis
(74) *Attorney, Agent, or Firm* — McDermott Will & Emery LLP

(57) ABSTRACT

A detecting unit outputs an object signal corresponding to an inertial force. A corrected signal is generated by correcting the object signal. A first environment value is obtained at a first time point. A second environment value is obtained at a second time point after the first time point. An environment difference value which is a difference between the first and second environment values is calculated. An environment change detection signal is output when an absolute value of the environment difference value is larger than a predetermined determination threshold. A first averaged signal is output by averaging a corrected signal in a predetermined period continuing to the first time point. A second averaging signal is output by averaging the corrected signal in a predetermined period continuing to the second time point. An offset difference value which is a difference between the first and second averaged signals is calculated. The offset difference value is stored when the environment change detection signal is output. The corrected signal is generated by adding the stored offset difference value to the object signal. This method can easily reduce the output offset even if an environment, such as an ambient temperature, abruptly changes.

8 Claims, 17 Drawing Sheets

(56) References Cited

U.S. PATENT DOCUMENTS

| | | |
|---|---|---|
| 2004/0255673 A1 | 12/2004 | Hattori |
| 2007/0005215 A1 | 1/2007 | Nishioka |
| 2011/0041607 A1 | 2/2011 | Kuroda et al. |

FOREIGN PATENT DOCUMENTS

| | | |
|---|---|---|
| JP | 08-310339 A | 11/1996 |
| JP | 10-253360 A | 9/1998 |
| JP | 10-318757 A | 12/1998 |
| JP | 2000-088578 A | 3/2000 |
| JP | 2001-147167 A | 5/2001 |
| JP | 2001-327002 A | 11/2001 |
| JP | 2002-501168 A | 1/2002 |
| JP | 2003-106840 A | 4/2003 |
| JP | 2005-016975 A | 1/2005 |
| JP | 2007-010530 A | 1/2007 |
| JP | 2009-264937 A | 11/2009 |
| WO | 99/35468 A1 | 7/1999 |
| WO | 2009-125589 A1 | 10/2009 |

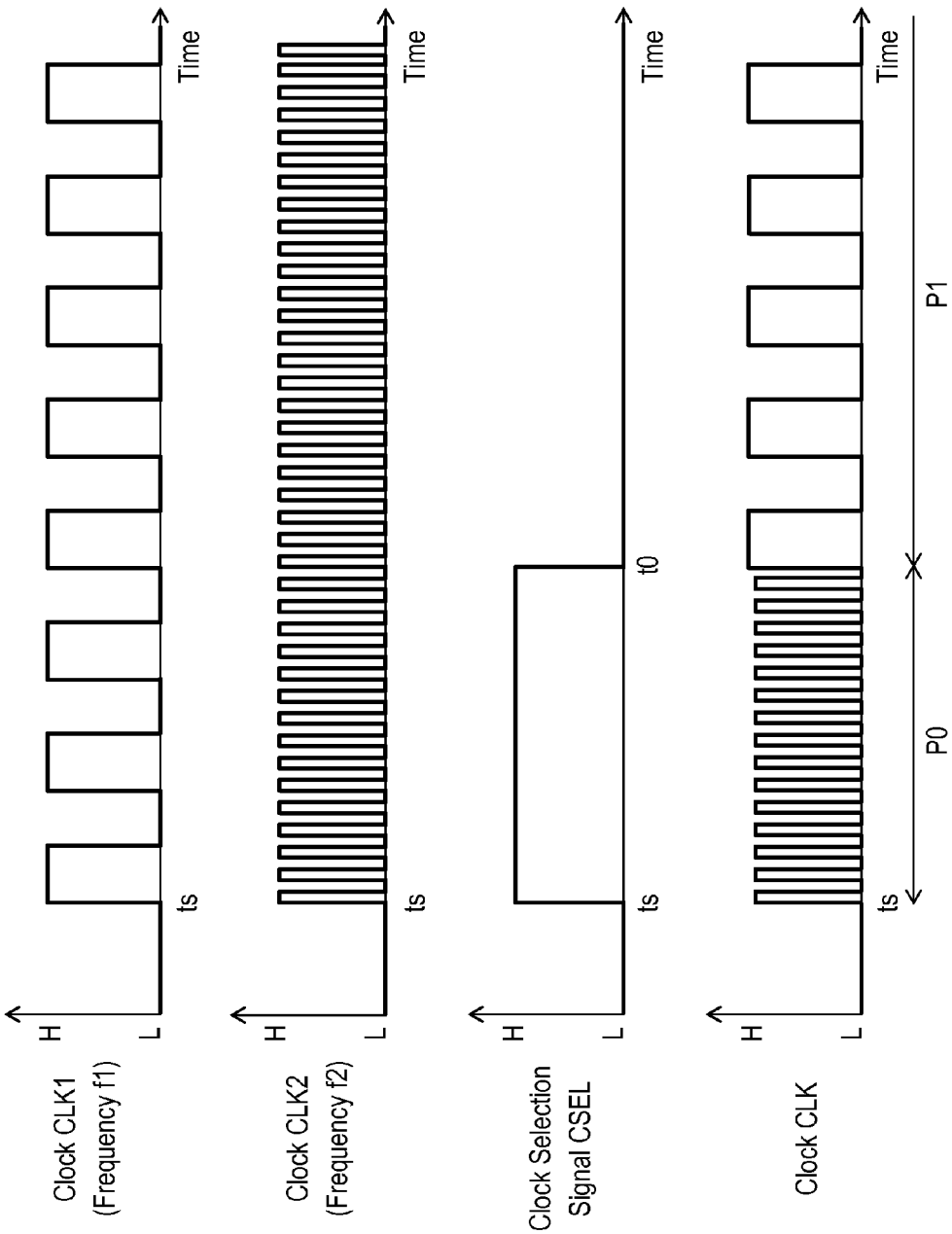

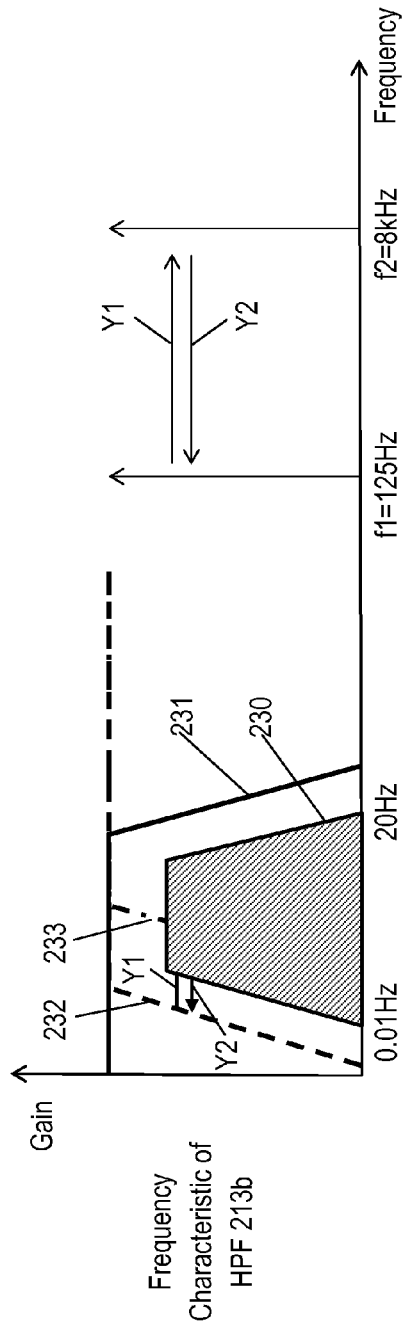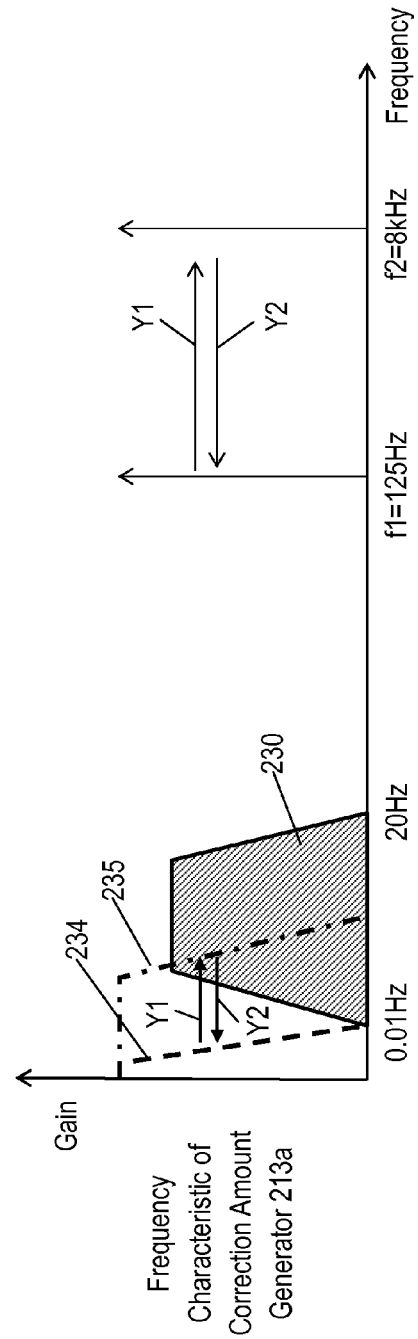

INERTIAL FORCE SENSOR AND ZERO POINT CORRECTION METHOD USED THEREIN

RELATED APPLICATIONS

This application is the U.S. National Phase under 35 U.S.C. §371 of International Application No. PCT/JP2012/002851, filed on Apr. 26, 2012, which in turn claims the benefit of Japanese Application No. 2011-099183, filed on Apr. 27, 2011 and Japanese Application No. 2011-106845, filed May 12, 2011, the disclosures of which Applications are incorporated by reference herein.

TECHNICAL FIELD

The present invention relates to an inertial force sensor, such as an angular velocity sensor and an acceleration sensor, and to a zero-point correction method in an input terminal of data communications terminals, such as mobile phones and smartphones, image stabilizers in digital still cameras, navigation systems, and vehicle control systems.

BACKGROUND ART

FIG. 17 is a block diagram of conventional inertial force sensor 801. Inertial force sensor 801 includes detecting element 802 having an inertial force applied thereto, detecting circuit 803 for detecting the amount of inertia corresponding to the inertial force, low pass filter (LPF) 804 connected to an output port of detecting circuit 803, and correction circuit 805 for correcting an output of LPF 804. Correction circuit 805 includes correction amount memory 806 for storing a correction amount written form an outside, and corrector 807 connected to an output port of LPF 804 and the output side of correction amount memory 806. Corrector 807 corrects an output of LPF 804 based on the correction amount stored in correction amount memory 806.

Inertial force sensor 801 outputs a predetermined reference signal, such as zero, when an inertial force is not input to inertial force sensor 801. When an inertial force is input, inertial force sensor 801 is required to output a signal corresponding to this inertial force. Therefore, deviations in output caused by manufacturing variations of detecting element 802 and output offset (initial offset) that typically arises from an electrical offset of detecting circuit 803 are measured, and their correction values are stored in correction amount memory 806 of inertial force sensor 801 before shipment.

In addition to output offsets that arise in the manufacturing process of inertial force sensors, an output offset value also changes from its initial value when an ambient temperature rapidly changes during the operation of the inertial force sensor. To correct the output offset even if a temperature change occurs, a look-up table is provided in the manufacturing process by storing correction amounts for correcting the output offset due to a temperature charge in a non-volatile memory. By referring to this look-up table, an appropriate output offset can be applied, corresponding to any change in ambient temperature.

To create and install this look-up table in the manufacturing process before shipment, in which ambient temperatures and corresponding offset correction values are written, manufacturing processes and manufacturing costs of inertial force sensor 801 increase.

Inertial force sensor 801 is applicable to a circuit for detecting camera shake of camcorder. In this case, inertial force sensor 801 detects angular velocity as the inertial force to detect the camera shake. Then, inertial force sensor 801 outputs a correction angle signal corresponding to this detection result. In the camcorder, camera shake at turning on power can be reduced by not applying correction using the correction angle signal before normal angular velocity signal is obtained by the inertial force sensor on turning on the power.

In inertial force sensor 801, the output offset may occur even if the inertial force is not input when a stress is applied to detecting element 802 or due to aging variation or environment change after a correction value is written in before shipment. A high pass filter can be inserted to remove this offset. However, due to delay time of the high pass filter, it takes time until a detection signal is stabilized at starting correction by the inertial force sensor at turning on power or resuming from the sleep mode.

Patent Literatures 1 to 5 disclose conventional inertial force sensors similar to inertial force sensor 801.

CITATION LIST

Patent Literature

Patent Literature 1: Japanese Patent Laid-Open Publication No. 5-207356
Patent Literature 2: Japanese Patent Laid-Open Publication No. 2000-088578
Patent Literature 3: Japanese Patent Laid-Open Publication No. 2001-147167
Patent Literature 4: Japanese Patent Laid-Open Publication No. 2001-327002
Patent Literature 5: Japanese Patent Laid-Open Publication No. 2002-501168

SUMMARY OF THE INVENTION

A detecting unit outputs an object signal corresponding to an inertial force. A corrected signal is generated by correcting the object signal. A first environment value is obtained at a first time point. A second environment value is obtained at a second time point after the first time point. An environment difference value which is a difference between the first and second environment values is calculated. An environment change detection signal is output when an absolute value of the environment difference value is larger than a predetermined determination threshold. A first averaged signal is output by averaging the corrected signal in a predetermined period continuing to the first time point. A second averaging signal is output by averaging the corrected signal in a predetermined period continuing to the second time point. An offset difference value which is a difference between the first and second averaged signals is calculated. The offset difference value is stored when the environment change detection signal is output. The corrected signal is generated by adding the stored offset difference value to the object signal. This method can easily reduce the output offset even if an environment, such as an ambient temperature, abruptly changes.

BRIEF DESCRIPTION OF DRAWINGS

FIG. 9 illustrates signals of the inertial force sensor in accordance with Embodiment 2.

FIG. 10A illustrates frequency characteristics of a high pass filter of the inertial force sensor in accordance with Embodiment 2.

FIG. 10B illustrates frequency characteristics of a correction amount generator of the inertial force sensor in accordance with Embodiment 2.

DETAIL DESCRIPTION OF PREFERRED EMBODIMENTS

First Exemplary Embodiment

Figure 1:
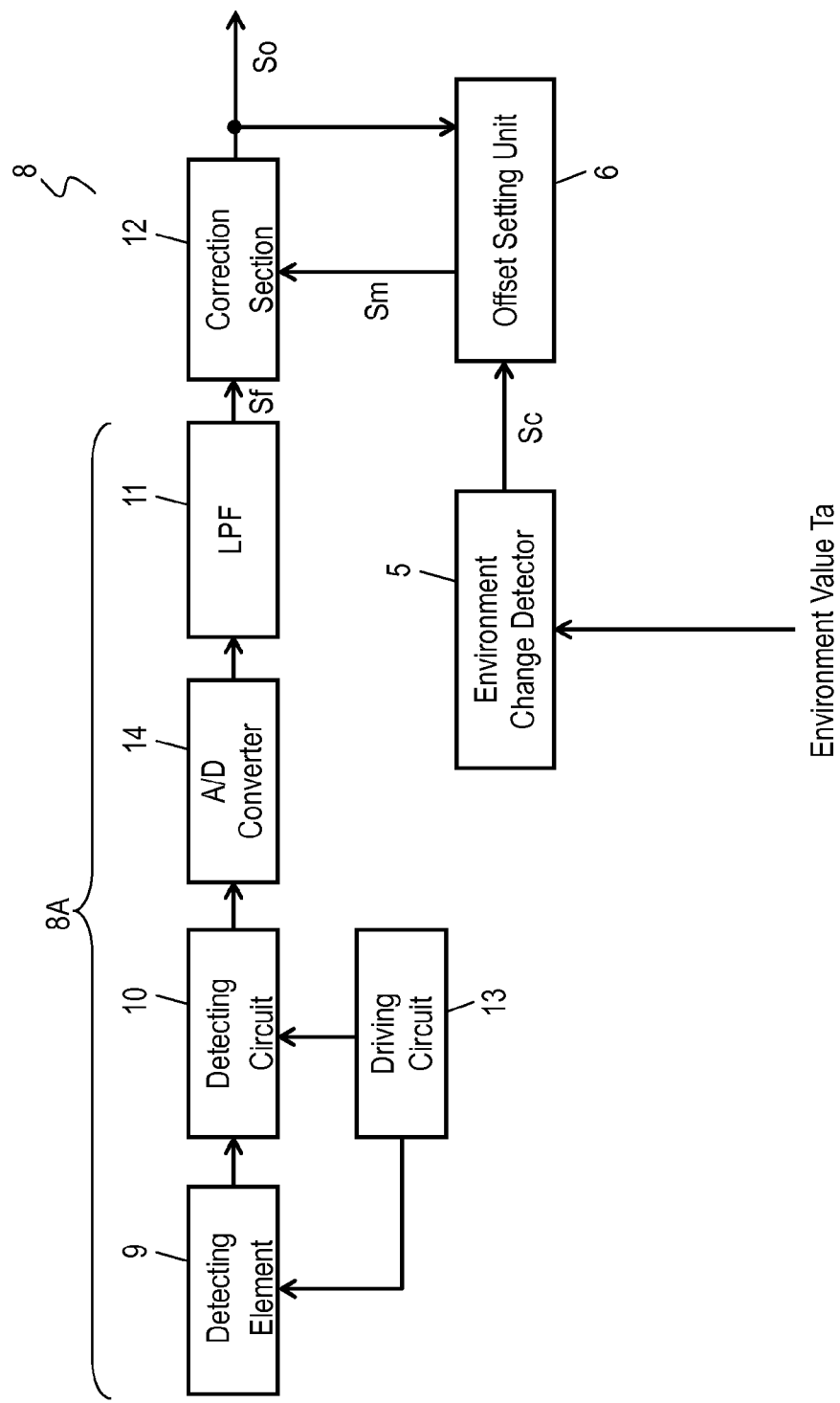
FIG. 1 is a block diagram of an inertial force sensor in accordance with Exemplary Embodiment 1.

FIG. 1 is a block diagram of inertial force sensor 8 in accordance with Exemplary Embodiment 1. Inertial force sensor 8 includes detecting element 9 arranged to have inertial force, such as angular velocity applied thereto, driving circuit 13 for driving detecting element 9, detecting circuit 10 for detecting the amount of inertia corresponding to the inertial force applied to detecting element 9, analog/digital (A/D) converter 14 for converting an analog signals output from detecting circuit 10 into a digital signal, low pass filter (LPF) 11 receiving the digital signal converted by A/D converter 14, and corrector 12 for correcting an output of LPF 11. Inertial force sensor 8 further includes environment change detector 5 for detecting a change of an ambient temperature, and offset setting unit 6 for setting offset correction value Sm based on environment change detection signal Sc output from environment change detector 5. This structure allows inertial force sensor 8 to easily reduce output offset even if any abrupt change occurs in the environment, accordingly, improving the output accuracy.

Figure 2:
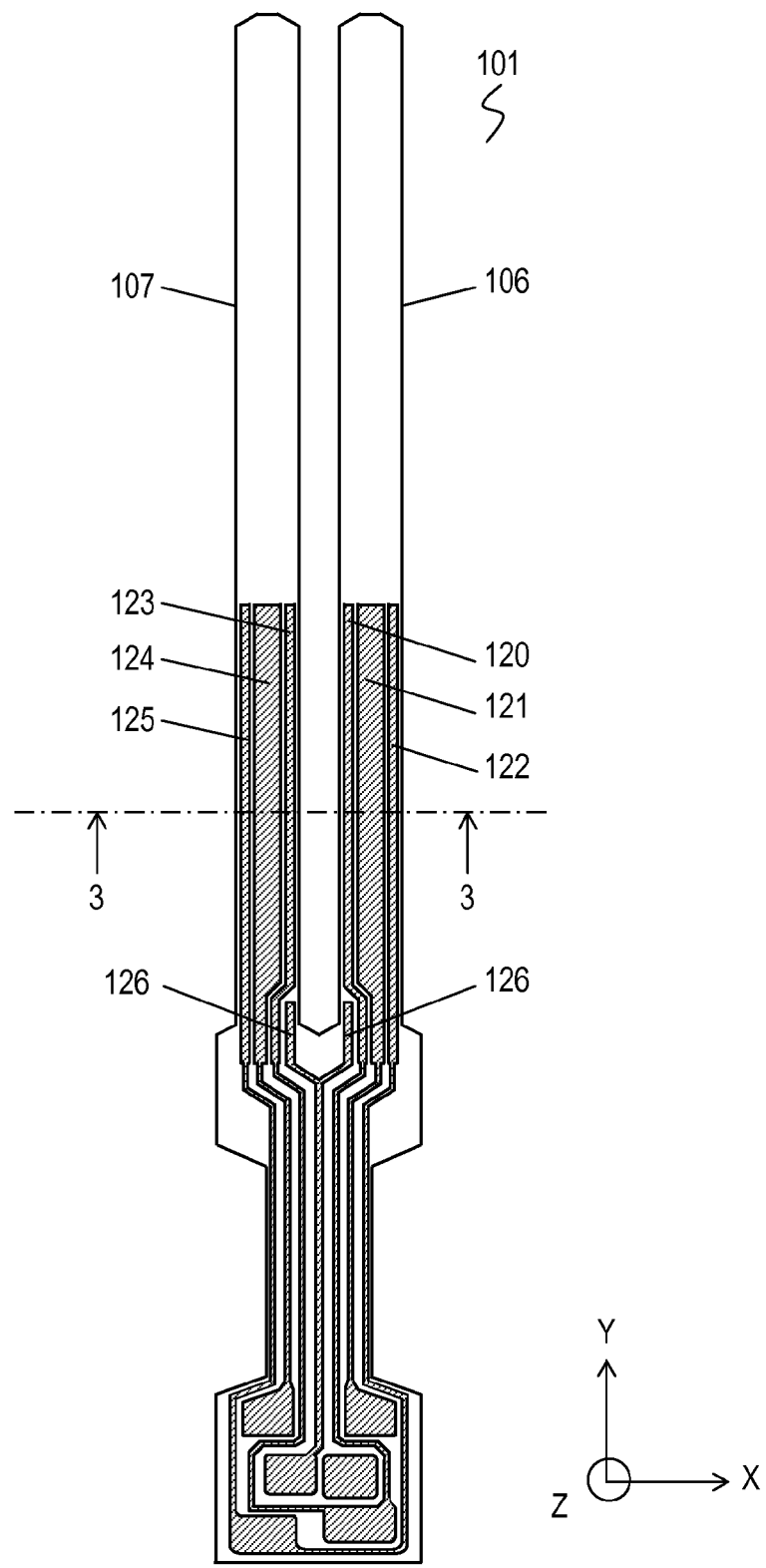
FIG. 2 is a top view of a detecting element of the inertial force sensor in accordance with Embodiment 1.
Figure 3:
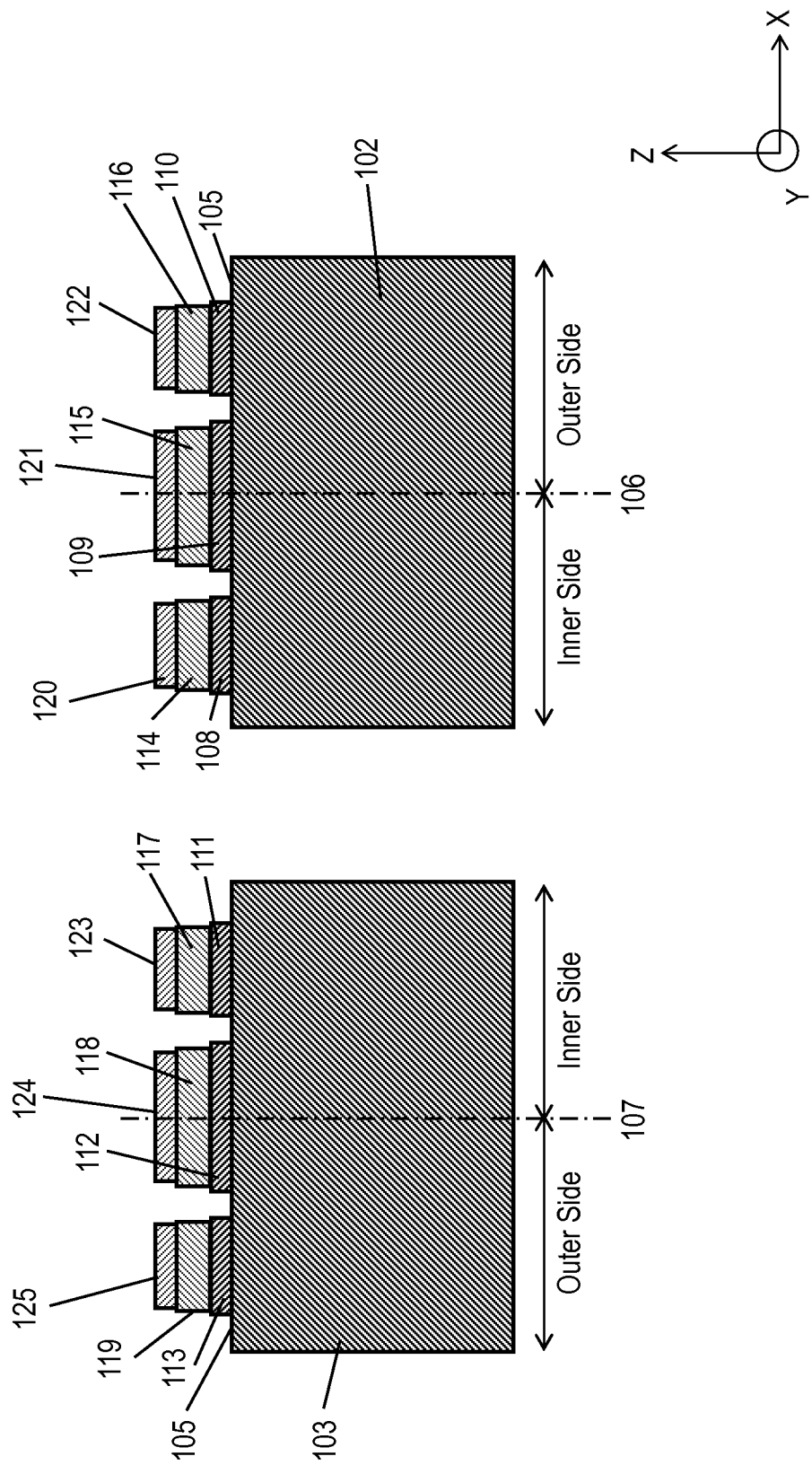
FIG. 3 is a sectional view of the detecting element at line 3-3 shown in FIG. 2.

FIG. 2 is a top view of tuning fork angular velocity sensor element 101 which is detecting element 9. FIG. 3 is a sectional view of angular velocity sensor element 101 at line 3-3 shown in FIG. 2. Angular velocity sensor element 101 includes silicon substrates 102 and 103 having tuning-fork shapes and lower electrodes 108, 109, 110, 111, 112, and 113 provided on silicon substrates 102 and 103. Angular velocity sensor element 101 further includes piezoelectric films 114, 115, 116, 117, 118, and 119 provided on lower electrodes 108, 109, 110, 111, 112, and 113 and upper electrodes 120, 121, 122, 123, 124, and 125 provided on piezoelectric films 114, 115, 116, 117, 118, and 119, respectively. Upper electrodes 120, 122, 123, and 125 are drive electrodes. Upper electrodes 121 and 124 are detection electrodes. All lower electrodes are connected to a reference potential. Silicon substrates 102 and 103 extend in the Y-axis direction to configure arms 106 and 107, respectively. Arms 106 and 107 are arranged in an X-axis direction. The X-axis, the Y-axis, and a Z-axis are perpendicular to each other.

Angular velocity sensor element 101 vibrates in the X-axis direction, as shown in FIG. 2, by applying a predetermined drive voltage to drive electrodes 120, 122, 123, and 125. While vibrating in the X-axis direction, arms 106 and 107 bend in the Z-axis direction due to a Coriolis force generated by an angular velocity when the angular velocity about the Y axis is applied to angular velocity sensor element 101. The bending of piezoelectric films 115 and 118 produces an electric charge in detection electrodes 121 and 124. Since this charge amount is proportional to the Coriolis force, the angular velocity can be detected.

Arms 106 and 107 of angular velocity sensor element 101 vibrate in directions opposite to each other along the X axis. Therefore, the Coriolis force generated when the angular velocity about the Y axis applied bends arms 106 and 107 in directions opposite to each other along to the Z axis. Therefore, electric charges generated in detection electrodes 121 and 124 corresponding to the Coriolis force, or currents that flow when connected to the circuit have polarities reverse to each other.

Electrode 126 outputs a signal synchronized to drive vibration of arms 106 and 107. This signal has a frequency identical to the frequency of the drive vibration. The signal output from electrode 126 is input to driving circuit 13, and is input to synchronous detector 65 of detecting circuit 67.

Figure 4:
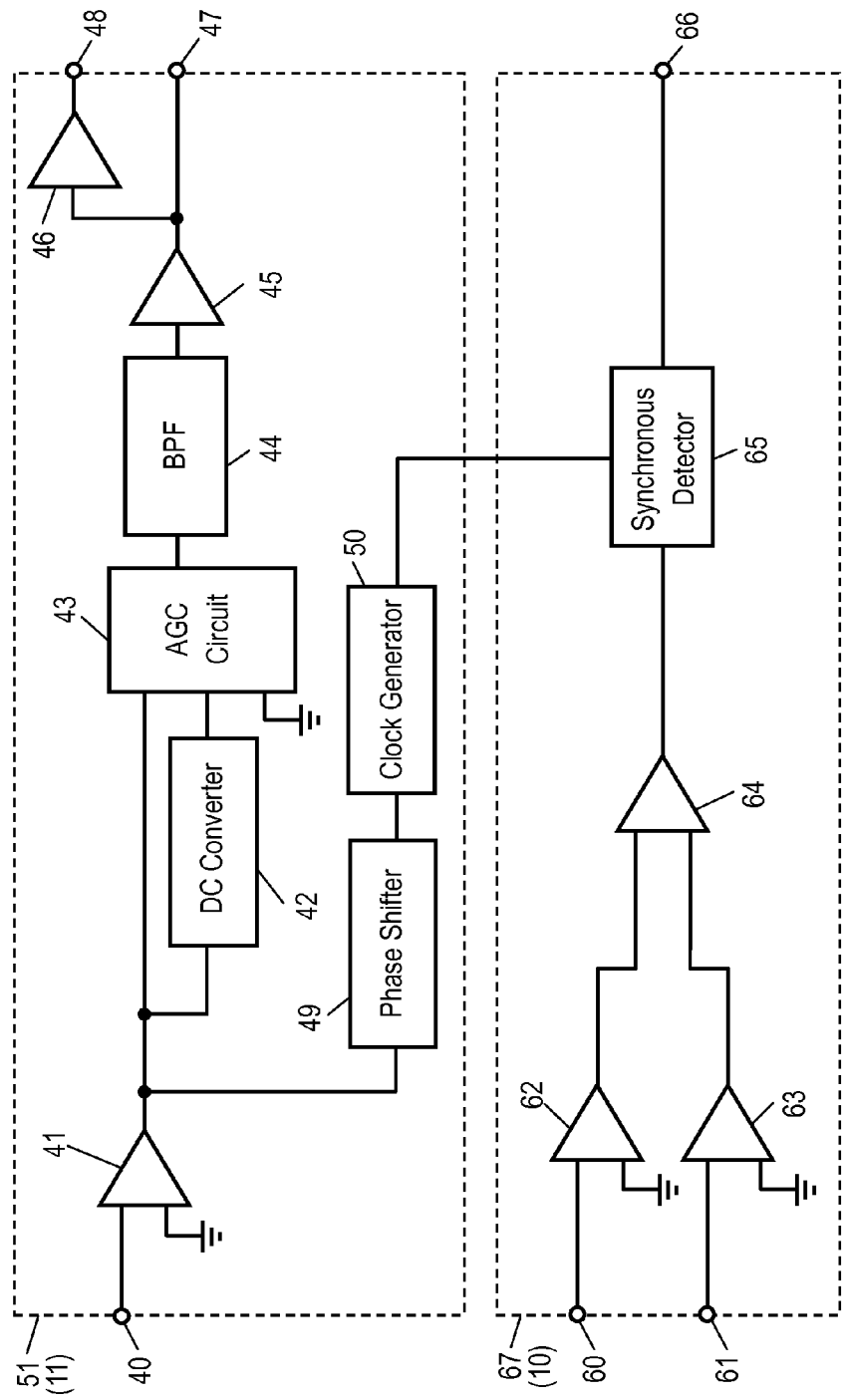
FIG. 4 is a block diagram of a detecting circuit and a driving circuit of the inertial force sensor in accordance with Embodiment 1.

FIG. 4 is a block diagram of detecting circuit 67 and driving circuit 51 functioning as detecting circuit 10 and driving circuit 13, respectively. Input terminals 60 and 61 are electrically connected to detection electrodes 121 and 124 of angular velocity sensor element 101, respectively. Currents having polarities reverse to each other are generated in detection electrodes 121 and 124 of angular velocity sensor element 101. Current-voltage converters 62 and 63 convert the currents to voltages. Differential amplifier 64 calculates the difference of the voltages, thereby actually adding the voltages. A signal output from difference amplifier 64 is input to synchronous detector 65. Synchronous detector 65 synchronously detects the signal output from difference amplifier 64 with a clock signal output from clock generator 50, and is output from detection output terminal 66 as a detection signal.

Driving circuit 51 drives angular velocity sensor element 101 shown in FIGS. 2 and 3. Monitor input terminal 40 is electrically connected to monitor electrode 126. A monitor current caused by charge generated in monitor electrode 126 is synchronized with drive vibration. Current-voltage converter 41 converts the monitor current to a voltage, and outputs the voltage as a monitor signal. Direct current (DC) converter 42 converts the monitor signal to a DC signal. Automatic gain control (AGC) circuit 43 amplifies the monitor signal at a gain corresponding to the level of DC signal output from DC converter 42. Band bass filter (BPF) 44 removes undesired frequency components in the amplified monitor signal. Output amplifier 45 amplifies an output of BPF 44. Inverting amplifier 46 inverts an output of output amplifier 45. The output of output amplifier 45 is connected to drive output terminal 47 while the output of inverting amplifier 46 is connected to drive output terminal 48. Drive output terminals 47 and 48 are connected to predetermined electrodes out of drive electrodes 120, 122, 123, and 125 of angular velocity sensor element 101.

Monitor input terminal 40 and drive output terminals 47 and 48 in driving circuit 51 are connected to angular velocity sensor element 101 to constitute a drive loop. The drive voltage is applied to angular velocity sensor element 101 by self-oscillation. As the level of DC signal output from DC converter 42 increases, the gain of AGC circuit 43 decreases. As this level decreases, the gain of AGC circuit 43 increases. This control roughly makes the level of the monitor signal input to AGC circuit 43 constant. As a result, amplitude of drive vibration is stabilized to be constant.

Phase shifter 49 rotates the phase of the monitor signal converted to a voltage by current-voltage converter 41 by 90 degrees. Clock generator 50 generates a clock signal of a rectangular wave for the synchronous detection by using the output of phase shifter 49. Synchronous detector 65 of detecting circuit 67 executes the synchronous detection by using a clock signal.

Inertial force sensor 8 outputs a signal having a predetermined reference value, such as zero, when the inertial force is not input. Upon having the inertial force input thereto, inertial force sensor 8 outputs a signal having a value corresponding to the inertial force. When the inertial force is not input, an output offset is a difference between the value of the output signal output and the predetermined reference value. Inertial force sensor 8 can reduce the output offset even if an environment change, such as abrupt change in ambient temperature during operation, occurs.

A/D converter 14 shown in FIG. 1 converts a detection signal, which is an analog signal output from synchronous detector 65, to a digital signal. LPF 11 passes and outputs a component as object signal SF, having a frequency not higher than a predetermined cutoff frequency in the detection signal converted to the digital signal. LPF 11 does not pass a component having a frequency higher than the cutoff frequency. In other words, LPF 11 attenuates the component having the frequency higher than the predetermined cutoff frequency in the signal output from detecting circuit 10, so as to limit a signal band to a frequency band containing a required angular velocity component. This suppresses a part of undesired signals. However, LPF 11 may not be able to suppress the output offset as the undesired signal of inertial force sensor 8 that is generated due to an abrupt change in environment.

Inertial force sensor 8 in accordance with Embodiment 1 includes environment change detector 5 and offset setting unit 6 to reduce the output offset even if an abrupt change in surrounding environment, such as ambient temperature, occurs. A zero-point correction method for reducing the output offset even if an abrupt change occurs in the environment of inertial force sensor 8 will be described below. Inertial force sensor 8 executes a correction against a change in environment, such as an ambient temperature. Detecting element 9, detecting circuit 10, driving circuit 13, A/D converter 14, and LPF 11 constitute detecting unit 8A which detects the inertial force, such as angular velocity and acceleration, applied to detecting element 9, and outputs object signal Sf corresponding to the inertial force.

Figure 5:
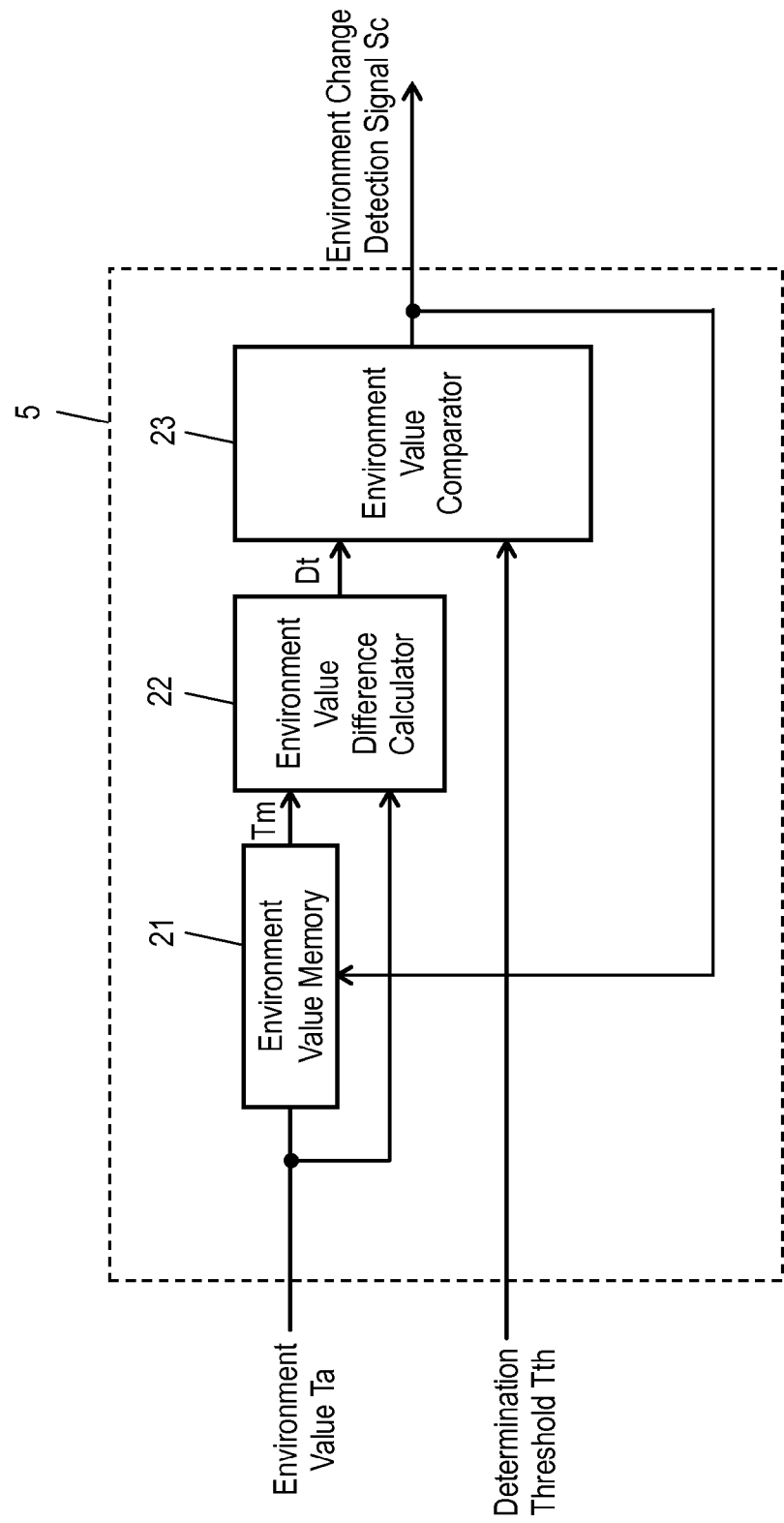
FIG. 5 is a block diagram of an environment change detector of the inertial force sensor in accordance with Embodiment 1.

FIG. 5 is a block diagram of environment change detector 5. Environment change detector 5 includes environment value memory 21, environment value difference calculator 22, and environment value comparator 23. Environment value memory 21 receives environment value Ta that is an ambient temperature around detecting element 9, and stores and outputs environment value Ta as environment value Tm. Environment value difference calculator 22 calculates environment value difference Dt that is an absolute value of the difference between environment value Tm stored in environment value memory 21 and environment value Ta at a present. Environment value comparator 23 compares calculated environment value difference Dt and predetermined determination threshold Tth.

Initial value Ti of environment value Ta stored by environment value memory 21 is environment value Ta determined in a manufacturing process of inertial force sensor 8. In the manufacturing process, inertial force sensor 8 is adjusted such that the output offset becomes zero at initial value Ti of environment value Ta.

The environment, i.e., the ambient temperature that inertial force sensor 8 is actually used, is often different from the environment, i.e., an ambient temperature in the manufacturing process. At the time of shipping inertial force sensor 8 from the manufacturing process, environment value memory 21 stores initial value Ti as environment value Tm. Environment value difference calculator 22 outputs, at predetermined time interval Tr, environment difference value D1 which is the absolute value of the difference between actual environment value Ta and environment value Tm stored in environment value memory 21.

Environment value comparator 23 compares environment difference value Dt with determination threshold Tth at predetermined time interval Tr. More specifically, a latch signal is input to environment value comparator 23 at predetermined time interval Tr, and the latch signal functions as a trigger to detect the difference obtained by subtracting determination threshold Tth from environment difference value Dt. If the detected difference is positive, environment value comparator 23 outputs environment change detection signal Sc indicating that the environment has changed. If the difference is zero or negative, environment value comparator 23 does not output environment change detection signal Sc, thus indicating that the environment has not changed. According to Embodiment 1, predetermined time interval Tr is not smaller than 5 msec.

As described above, when a change larger than determination threshold Tth of environment difference value Dt occurs, environment change detection signal Sc is generated. When a change greater than determination threshold Tth of environment difference value Dt does not occur, environment change detection signal Sc is not generated. Then, the output of inertial force sensor S is corrected based on environment change detection signal Sc. Determination threshold Tth can be set from an outside of environment change detector 5 or an outside of inertial force sensor 8, and thus it can be easily changed.

Environment value Ta at the time when environment change detection signal Sc is generated is stored in environment value memory 21 as environment value Tm. More specifically, environment change detection signal Sc functions as a latch signal to allow environment value memory 21 to store environment value Ta as environment value Tm. This operation enables to compare a change of environment value Ta on and after the time when an environment change is detected, using environment value Ta as the reference value at this time.

Figure 6:
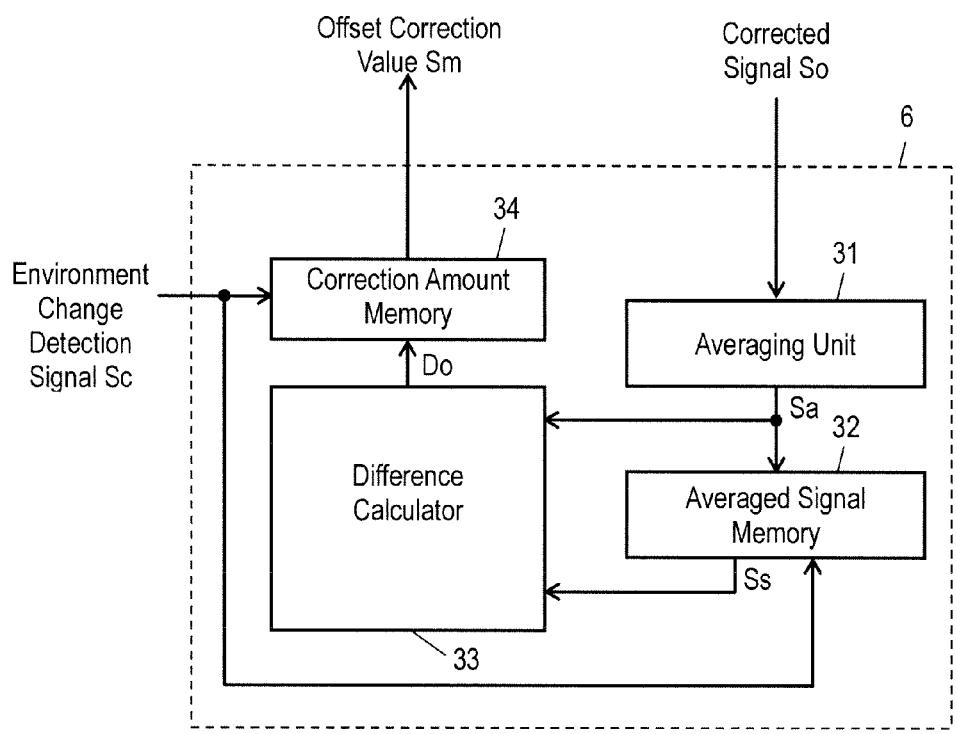
FIG. 6 is a block diagram of an offset setting unit of the inertial force sensor in accordance with Embodiment 1.

FIG. 6 is a block diagram of offset setting unit 6. Offset setting unit includes averaging unit 31, averaged signal memory 32, difference calculator 33, and correction amount memory 34. Averaging unit 31 outputs averaged signal Sa that is obtained by adding and averaging corrected signals So output from correction section 12 (FIG. 1) in predetermined period Pa up to the present. Averaged signal memory 32 stores averaged signal Sa output from averaging unit 31 and output the stored averaged signal Sa as averaged signal Ss. Difference calculator 33 calculates the difference, as offset difference value Do, obtained by subtracting averaged signal Sa from averaged signal Ss stored in averaged signal memory 32. Correction amount memory 34 stores offset difference value Do.

Corrected signal So output from correction section 12 has an offset generated by a change in an ambient temperature, the environment. To correct the offset and maintain appropriate zero point, correction section 12 adds offset correction value Sm output from offset setting unit 6 to object signal Sf output from LPF 11.

Averaging unit 31 calculates averaged signal Sa obtained by averaging corrected signals So output from correction section 12 in predetermined period Pa up to a certain time, and outputs averaged signal Sa of at the certain time. Averaging unit 31 sums up offset values that are corrected signal So output from correction section 12 at predetermined time interval Tq in predetermined period Pa.

According to Embodiment 1, averaging unit 31 calculates the total value by adding offset values thirty two times at predetermined time interval Tq, using a digital adder. In other words, predetermined period Pa is thirty two times of predetermined time interval Tq. Then, the total value is divided by thirty two by shifting the total value by four bits toward a least significant bit to obtain averaged signal Sa. In general, averaging unit 31 calculates the total value by adding corrected signal So only $2^n$ times at predetermined time interval Tq, and the total value is shifted for n-bits toward a least significant bit. This enables to easily obtain averaged signal Sa. Here, number "n" is a natural number. Predetermined period Pa is n-times the predetermined time interval Tq. According to Embodiment 1, predetermined time interval Tq at which corrected signals So are added is $\frac{1}{32}$ of predetermined time interval Tr at which the environment value is detected. However, predetermined time interval Tq is smaller than $\frac{1}{32}$ of predetermined time interval Tr. In other words, in averaging unit 31 in inertial force sensor 8 in accordance with Embodiment 1, predetermined period Pa for adding corrected signal So n-times is the same as predetermined time interval Tr for detecting the environment value, but may be shorter than predetermined time interval Tr.

An initial value of offset correction value Sm stored in averaged signal memory 32 is averaged an offset value set in the manufacturing process of inertial force sensor 8. This initial value is adjusted such that the offset of corrected signal So becomes zero in accordance with the environment value in the manufacturing process. Then, averaged signal memory 32 stores averaged from averaging unit 31, averaged signal Sa averaged until the time when the environment change detection signal is generated.

Difference calculator 33 calculates an offset difference value between averaged signal Sa from averaging unit 31 that is an average value up to the present synchronized with a latch signal generated at predetermined time interval Tr, and the averaged offset value output from averaged signal memory 32. This offset difference value is updated at predetermined time interval Tr.

Correction amount memory 34 stores the offset difference value output from difference calculator 33 based on environment change detection signal Sc. Simultaneously, correction amount memory 34 outputs stored offset difference value to correction section 12 as offset correction value Sm. Correction section 12 outputs corrected signal So obtained by adding offset correction value Sm to object signal Sf output from LPF 11. Offset difference value Do can be updated every predetermined time interval Tr, but correction amount memory 34 does not update stored offset difference value unless environment change detection signal Sc is generated. Offset correction value Sm is thus not updated. In other words, correction amount memory 34 updates offset correction value Sm by storing offset difference value Do output from difference calculator 33 when environment change detection signal Sc is generated. In addition, correction amount memory 34 does not update stored offset difference value when environment change detection signal Sc is not generated, and thus, offset correction value Sm is not updated.

Figure 7:
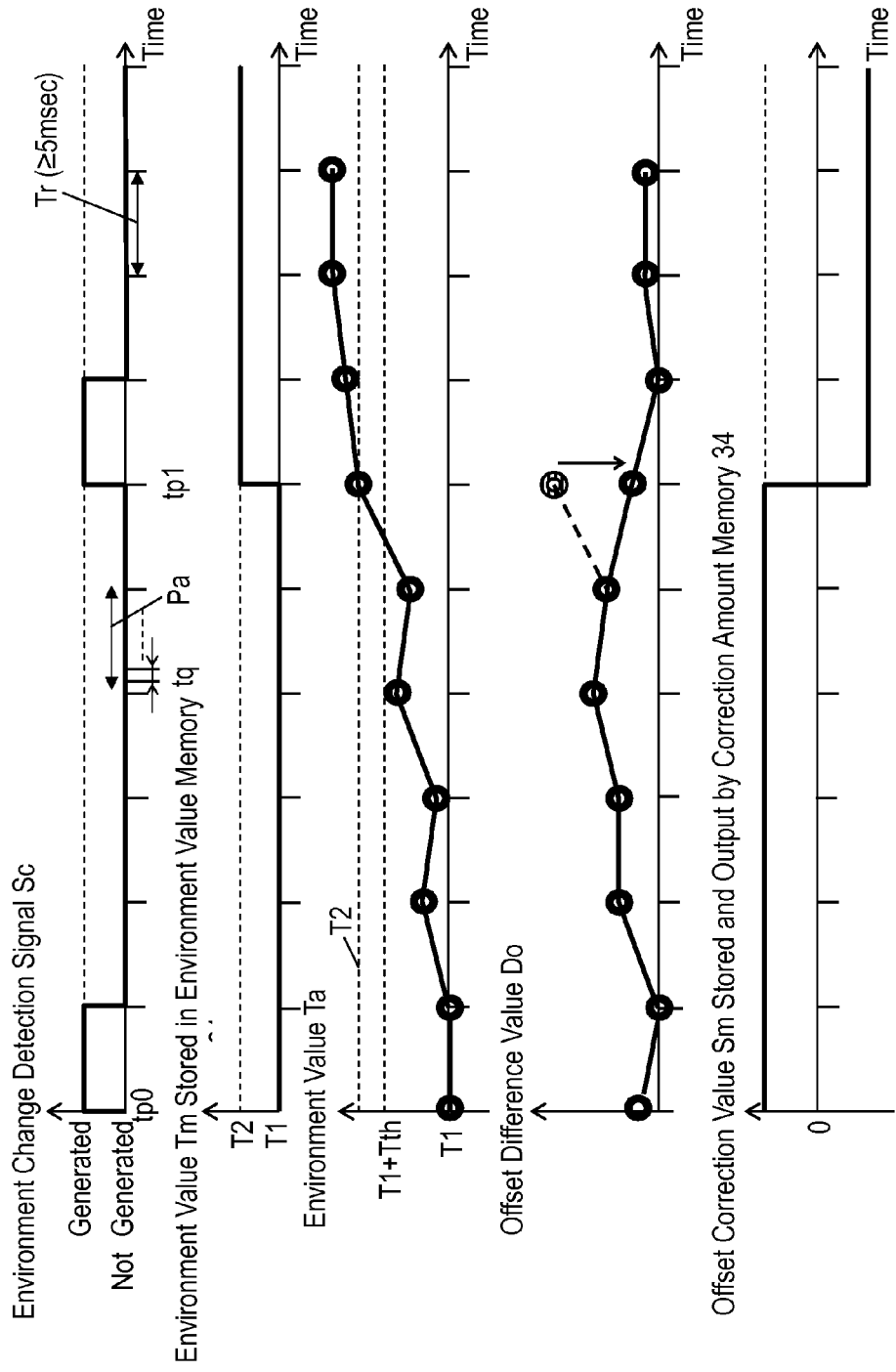
FIG. 7 illustrates signals of the inertial force sensor in accordance with Embodiment 1.

FIG. 7 illustrates signals of inertial force sensor 8, particularly environment change detection signal Sc, environment values Ta and Tm, offset difference value Do, and offset correction value Sm. According to Embodiment 1, the environment value is a temperature value.

At time point tp0, environment change detection signal Sc is generated and allows environment value memory 21 to store environment value T1. At time point tp0, correction amount memory 34 stores offset difference value Do at time point tp0. Averaged signal memory 32 stores averaged signal Sa at time point tp0 as averaged signal Ss.

After time point tp0 and before next environment change detection signal Sc is generated, environment value memory 21 stores environment value T1. After environment change detection signal Sc is generated, environment value memory 21 stores environment value T2. Environment values T1 and T2 and determination threshold Tth satisfy T2−T1>Tth.

When environment change detection signal Sc is generated at time point tp1 after time point tp0, the environment value stored in environment value memory 21 changes from environment value T1 to environment value T2. Up to just before time point tp1, averaged signal memory 32 stores, as averaged signal Ss, averaged signal Sa at time point tp0 when environment change detection signal Sc is previously generated. Averaged signal memory 32 newly receives averaged signal Sa output from averaging unit 31 when environment change detection signal Sc is generated at time point tp1, and stores averaged signal Sa as averaged signal Ss. Simultaneously, correction amount memory 34 receives and stores offset difference value Do output from difference calculator 33 at time point tp1 when environment change detection signal Sc is generated. Correction section 12 adds offset the stored difference value Do to object signal Sf output from LPF 11, and thus corrected signal So maintains an appropriate zero point.

If the zero point is appropriately maintained, the absolute value of offset difference value Do calculated by difference calculator 33 afterward becomes small at time point tp1, as shown in FIG. 7.

If offset difference value Do (offset correction value Sm) that correction section 12 adds under the condition of T2−T1>Tth is negative, offset difference value Do added by correction section 12 under the condition T1−T2>Tth generally is positive.

After time point tp1, similarly, when environment value Ta changes from environment value T2 to environment value T3 by an absolute value larger than determination threshold Tth, environment value comparator 23 of environment change detector 5 outputs environment change detection signal Sc, and the environment value memory stores environment value T3. When environment change detection signal Sc is output, averaged signal memory 32 stores, as averaged signal Ss, averaged signal Sa at that time point. Correction amount memory 34 stores, as offset correction value Sm, offset difference value Do at that point.

The above offset adjustment is executed when an inertial force is not applied to detecting element 9.

This zero point correction method is also applicable to adjust an offset not only in the X-axis direction of inertial force sensor 8, but also in the Y-axis and Z-axis directions.

Inertial force sensor 8 adopting this zero-point correction method can easily reduce the output offset even if an abrupt change occurs in the environment.

In inertial force sensor 8 in accordance with Embodiment 1, the environment value is a temperature value. However, this method is applicable for correcting a zero point against the change of an environment, such as including light, sound, acceleration, and pressure, other than the temperature around inertial force sensor 8. Furthermore, inertial force sensor 8 in accordance with Embodiment 1 executes digital signal processing by using A/D converter 14. However, inertial force sensor 8 in accordance with Embodiment 1 may execute analog processing for zero point correction without using A/D converter 14.

Exemplary Embodiment 2

Figure 8:
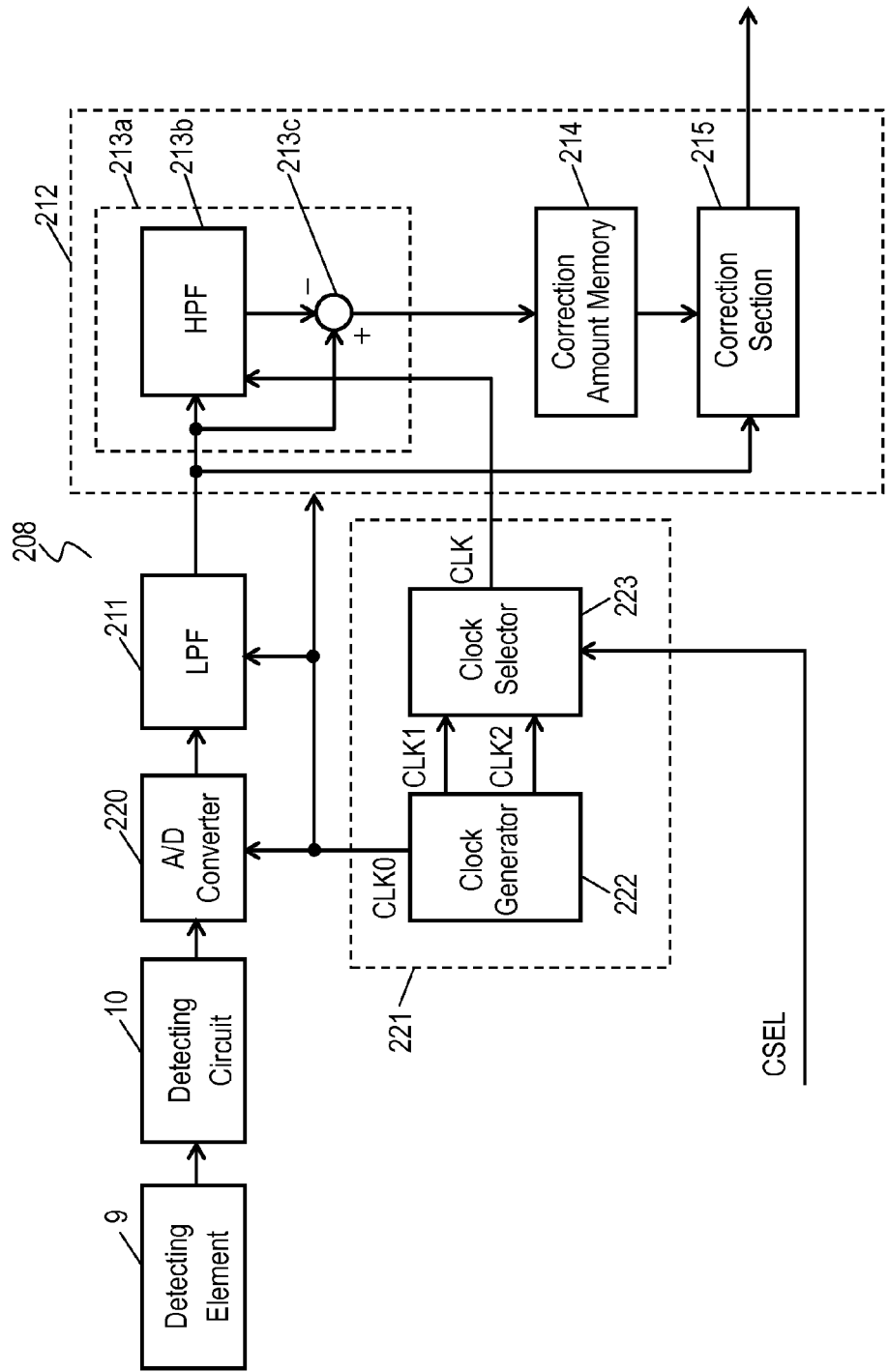
FIG. 8 is a block diagram of an inertial force sensor in accordance with Exemplary Embodiment 2.

FIG. 8 is a block diagram of inertial force sensor 208 in accordance with Exemplary Embodiment 2. In FIG. 8, components identical to those of inertial force sensor 8 in accordance with Embodiment 1 shown in FIGS. 1 to 4 are denoted by the same reference numerals. Inertial force sensor 208 in accordance with Embodiment 2 includes detecting element 9 having an inertial force, such as angular velocity, applied thereto, detecting circuit 10 for detecting the amount of inertia corresponding to the inertial force applied to detecting element 9, analog/digital (A/D) converter 220 for converting analog signals output from detecting circuit 10 to digital signals, low pass filter (LPF) 211 that receives digital signals converted in A/D converter 220, correction circuit 212 for correcting the output of LPF 211, and clock generating unit 221 for generating a clock signal for operating circuits provided after A/D converter 220.

Correction circuit 212 includes correction amount generator 213a connected to the output port of LPF 211, correction amount memory 214 connected to the output port of correction amount generator 213a, and correction section 215 connected to the output port of LPF 211 and the output port of correction amount memory 214.

Correction section 215 corrects an output value of LPF 211 based on a correction amount stored in correction amount memory 214 similarly to correction section 12 of inertial force sensor 8 in accordance with Embodiment 1 shown in FIGS. 1 to 4. This structure can reduce the output offset contained in the output value while the inertial force is not input even after the correction value is written in before shipment.

Furthermore, inertial force sensor 208 can reduce not only the output offset due to a stress other than the inertial force applied to detecting element 9, but also the output offset caused by environment change and change with time of a case, detecting element 9, and detecting circuit 10.

The frequency of the output offset according to the change with time of detecting element 9 and detecting circuit 10 is lower than a frequency of desired angular velocity components, and is not higher than 0.001 Hz or is 0 Hz. For example, the output offset caused by external stress generated by a warpage of a board having the sensor mounted thereon has a frequency sufficiently lower than a frequency of desired angular velocity components. The output offset appears as almost direct current (DC) component.

Figure 17:
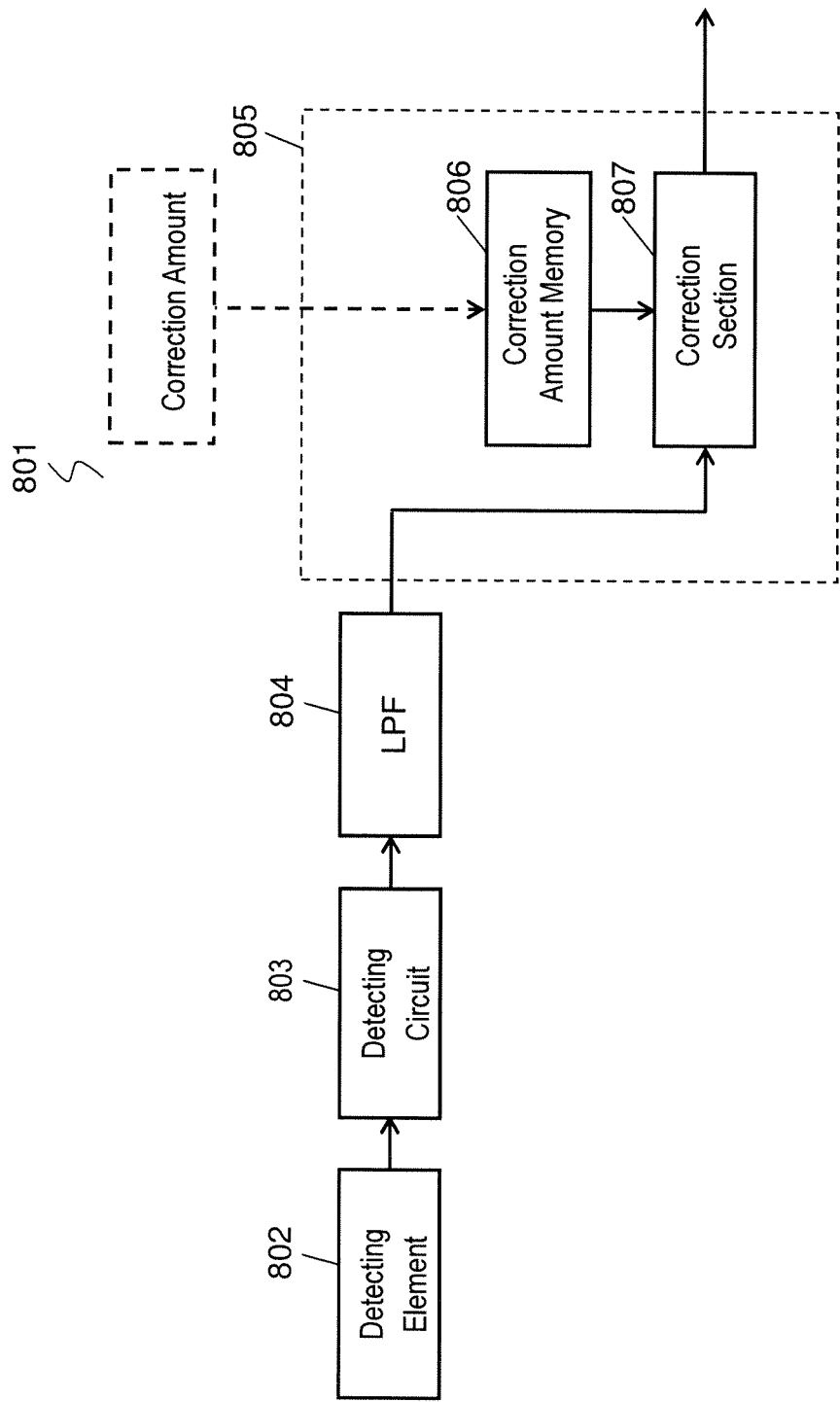
FIG. 17 is a block diagram of a conventional inertial force sensor.

In conventional inertial force sensor 801 shown in FIG. 17, the output of LPF 804 is corrected by the correction value stored before shipment. Therefore, the output offset according to a change with time of detecting element 9 or a detecting circuit while inertial force sensor 801 is used after shipment cannot be corrected. Inertial force sensor 208 in accordance with Embodiment 2 can reduce the output offset even after shipment.

An operation of inertial force sensor 208 will be detailed below. LPF 211 attenuates components having frequencies not higher than a predetermined cutoff frequency in the output of detecting circuit 10 so as to limit a frequency band of the output signal to a frequency band including desired angular velocity components. LPF 211 is a filter to suppress a part of undesired signals. Instead of LPF 211, a band pass filter that passes signals in a frequency band including the desired angular velocity components may be used.

Correction amount generator 213a includes high pass filter (HPF) 213b connected to the output port of LPF 211, the output port of LPF 211, and processing circuit 213c connected to the output side of HPF 213b. Processing circuit 213c outputs a difference between the output value of LPF 211 and the output value of HPF 213b.

Cutoff frequency fc1 of LPF 211 is higher than cutoff frequency fch of HPF 213b. This arrangement can extract frequency components lower than cutoff frequency fch of HPF 213b as the output offset.

For example, when frequencies of required angular velocity components ranges from 0.001 Hz to 20 Hz, cutoff frequency of LPF 211 is not lower than 20 Hz, and cutoff frequency of HPF 213b is not higher than 0.001 Hz. This allows the sensor to detect angular velocity components having frequencies ranging from 0.001 Hz to 20 Hz while removing undesired offset components having frequencies not higher than 0.001 Hz.

Clock generating unit 221 includes clock generator 222 and clock selector 223. Clock generator 222 generates three clocks: Clock CLK0 having frequency f0, clock CLK1 having frequency f1, and clock CLK2 having frequency f2 higher than frequency f1. Clock selector 223 selects one of clocks CLK1 and CLK2 according to clock selection signal CSEL supplied from an outside of clock selector 223, and outputs the selected clock as clock CLK.

Clock CLK is supplied to the clock input to HPF 213b. Clock CLK0 is supplied to circuits other than HPF 213b, i.e., to A/D converter 220, LPF 211, processing circuit 213c, correction amount memory 214, and correction section 215. The ratio of any two frequencies out of frequencies f0, f1, and f2 of clocks CLK0, CLK1, and CLK2 is a power of two. Interpolating or thinning out of sampled values is executed between circuits operated based on different frequency clocks.

Frequency f0 of clock CLK is determined to be at least twice the frequency of angular velocity detection signals due to a sampling theorem. According to Embodiment 2, frequencies f0, f1, and f2 are determined as f0=1 kHz, f1=125 Hz, and f2=8 kHz.

A method of improving responsivity, i.e., increasing a responsive speed, at starting correction of inertial force sensor 208 will be described below. For example, in the case that inertial sensor 208 is installed into a camera and it takes time to respond at starting correction, a monitor image shakes on a monitor screen immediately after starting correction. Here, the correction start time of inertial force sensor 208 includes the timings when inertial force sensor 208 is turned on, when a command signal is received from an external host, and when a sleep mode is released if inertial force sensor 208 is equipped with the sleep mode for saving power.

In inertial force sensor 208, a reason for delayed response at starting correction is, as described above, a longer time spent for converging HPF 213b, which is time spent for stabilizing output values of HPF 213b, since cutoff frequency fch of HPF 213b is extremely low. In inertial force sensor 208 in accordance with Embodiment 2, cutoff frequency fch of HPF 213b is switched to a frequency higher than cutoff frequency fch in the normal operation state only at the time of starting correction. This operation decreases the converging time of HPF 213b, and improves responsivity at starting correction. Switching of cutoff frequency of HPF 213b will be detailed below.

In FIG. 8, HPF 213b is implemented by a digital filter of a predetermined order. For example, if a digital filter is implemented by a finite impulse response (FIR) filter, a frequency characteristic of the digital filter is determined by an order, filter coefficients, and the clock frequency supplied to the digital filter. Under the condition that the order and filter coefficients are fixed, as the clock frequency increases, the cutoff frequency increases. Under this condition, as the clock frequency decreases, the cutoff frequency decreases. In accordance with Embodiment 2, the cutoff frequency is switched by clock CLK supplied to HPF 213b.

In order to switch the cutoff frequency of the digital filter, the clock frequency may be fixed and the filter coefficients may be switched. However, a high-order filter is needed for the high pass filter having a cutoff frequency close to DC. This increases the size and increases power consumption of the filter. In addition, to switch the filter coefficients, the digital filter needs to be once reset. Therefore, it takes time to switch the filter coefficients. The output from the digital filter is interrupted during this switching time. On the other hand, the switching of the clock frequency of inertial force sensor 201 in accordance with Embodiment 2 can continuously switch the cutoff frequency immediately.

FIG. 9 shows waveforms of clock CLK1, clock CLK2, clock selection signal CSEL, and clock CLK of inertial force sensor 208.

At correction start time point ts for starting correction, clock selection signal CSEL is at a high level (H). After correction period P0 elapses from correction start time point ts to predetermined time point t0 when the correction is completed, clock selection signal CSEL switches from the high level to a low level (L). Clock selector 223 selects clock CLK2 having high frequency f2 during correction period P0 in which clock selection signal CSEL is at the high level, and outputs clock CLK2 as clock CLK. During normal operation period P1 in which clock selection signal CSEL is at the low level, clock CLK1 having low frequency f1 is selected and output as clock CLK. Accordingly, clock CLK supplied to the clock input of HPF 213b continuously switches from clock CLK2 to clock CLK1 after correction period P0 from correction start time point ts. Correction period T0 may be a fixed, predetermined value, or may be adjustable from outside. As described later, correction period P0 is preferably longer than the converging time of HPF 213b. According to Embodiment 2, clock selection signal CSEL before time point ts is at the low level. Accordingly, clock selector 223 selects and outputs clock CLK1 and as clock CLK in a period until time point ts.

In normal operation period P1 starting from predetermined time point t0, clock selector 223 selects and outputs clock CLK1 as clock CLK. In normal operation period P1, correction section 215 reduces the output offset based on the correction amount stored in correction amount memory 214, and outputs the angular velocity component after correcting the output of LPF 211.

FIG. 10A shows a frequency characteristic of HPF 213b. FIG. 10B shows a frequency characteristic of the output of correction amount generator 213a, i.e., processing circuit 213c. In FIG. 10A, the horizontal axis represents a frequency, and the vertical axis represents the gain of HPF 213b. In FIG. 10B, the horizontal axis represents the frequency, and the vertical axis represents the gain of correction generator 213a, i.e., processing circuit 213c. In FIG. 10A, profile 231 indicated by the solid line is a frequency characteristic of LPF 211, profile 233 denoted by the dashed-dotted line is a frequency characteristic of HPF 213b in correction period P0, and profile 232 denoted by the broken line is a frequency characteristic of HPF 213b in normal operation period P1. In FIG. 10B, profile 235 denoted by the dashed-dotted line is frequency characteristic of correction amount generator 213a in correction period P0, and profile 234 denoted by the broken line is a frequency characteristic of correction amount generator 213a in normal operation period P1.

As indicated by arrow Y1 shown in FIG. 10A, the characteristic of HPF 213b changes from profile 232 to profile 233 by increasing the frequency of clock CLK supplied to the clock input of HPF 213b from f1 (=125 Hz) to f2 (=8 kHz) at the starting of the correction. This operation can increase the cutoff frequency fch, and reduces the converging time of HPF 213b. After completing correction period P0, as indicated by arrow Y2, cutoff frequency fch can decrease below the frequency band of angular velocity detection signal 230, such as profile 232, by decreasing the frequency of clock CLK supplied to the clock input of HPF 213b to f1=125 Hz.

The above operation, as shown in FIG. 10B, can extract the output offset with low frequency near DC at a band below the band of angular velocity detection signal 230, such as profile 234, from the correction signal output from processing circuit 213c in normal operation period P1. In correction period P0, a part of angular velocity detection signal 230 is included in the correction signal, but the output of inertial force sensor 208 is not used in this period, thus not providing any problem. Alternatively, correction section 215 may not execute the correction for a predetermined time from correction start time point ts. In this way, the output offset during normal operation can be reduced, and a response at starting correction can also be made faster.

Figure 11:
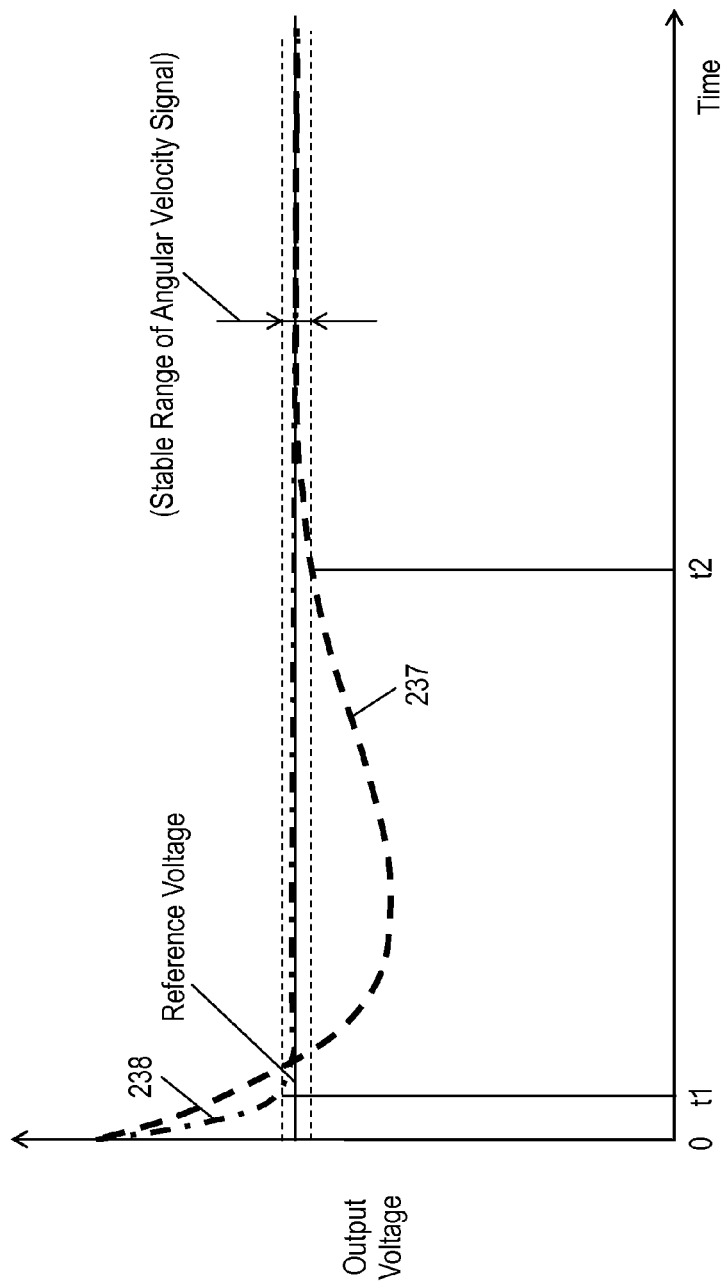
FIG. 11 illustrates an output of the inertial force sensor in accordance with Embodiment 2.

FIG. 11 shows outputs of correction circuit 212 of inertial force sensor 208 in accordance with Embodiment 2, and illustrates a time until the correction output reaches a stable range (converging time of HPF 213b). In FIG. 11, the vertical axis represents an output voltage expressed by a digital value, and the horizontal axis represents a time. FIG. 11 shows characteristics when an angular velocity about the Y-axis is applied to detecting element 9 (FIG. 2). As shown in FIG. 11, voltage 237 denoted by a broken line is an output voltage when the frequency of clock CLK supplied to the clock input of HPF 213b is f1=125 Hz. Voltage 238 denoted by the dashed-dotted line is an output voltage when frequency of clock CLK is f2=8 kHz. As shown in FIG. 11, converging time t1 when the frequency of clock CLK is f2=8 kHz is drastically shorter than converging time t2 when frequency of clock CLK is f1=125 Hz. In inertial force sensor 208 in accordance with Embodiment 2, converging time t1 is not larger than 0.3 sec, and converging time tw is about 20 sec.

A high pass filter having a cutoff frequency lower than the lower limit frequency of the frequency band of a desired angular velocity may be connected in series between LPF 211 and correction section 215 without correction amount generator 213a, thereby removing output offset components lower than the cutoff frequency. Alternatively, output offset components only near DC can also be removed by providing a capacitor for removing DC components between LPF 211 and correction section 215. However, in these structures, detection signals themselves, i.e., signals in practical use range, pass the high pass filter or capacitor. This causes delay of detection signals. On the other hand, inertial force sensor 208 in accordance with Embodiment 2 can remove undesired offset components without providing a circuit, such as high pass filter and capacitor, with a large delay amount between LPF 211 and correction section 215.

Exemplary Embodiment 3

Figure 12:
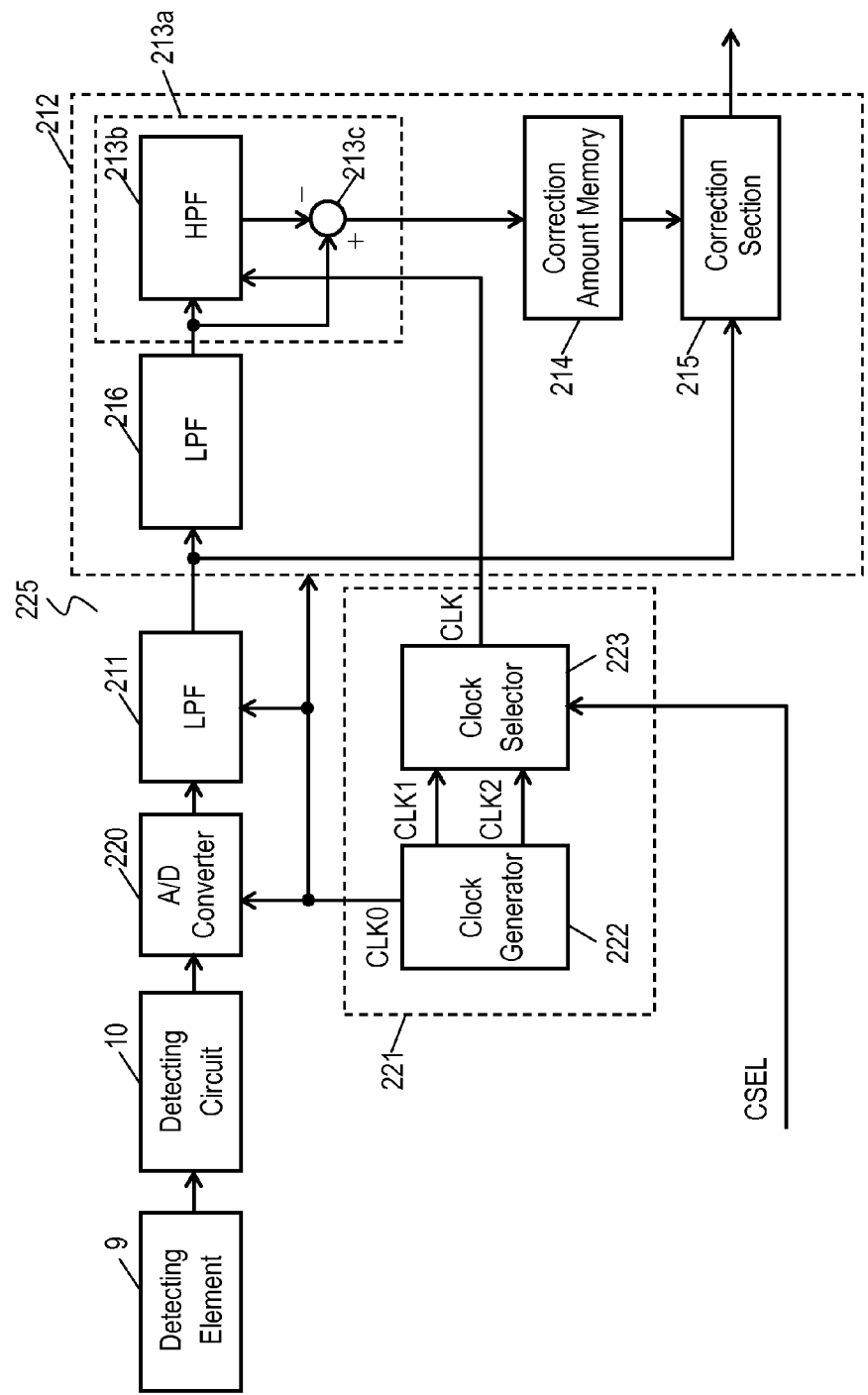
FIG. 12 is a block diagram of an inertial force sensor in accordance with Exemplary Embodiment 3.

FIG. 12 is a block diagram of inertial force sensor 225 in accordance with Exemplary Embodiment 3. In FIG. 12, components identical to those of inertial force sensor 208 in accordance with Embodiment 2 are denoted by the same reference numerals. Inertial force sensor 225 in accordance with Embodiment 3 shown in FIG. 12 further includes LPF 216 connected between LFP 211 and HPF 213b of inertial force sensor 208 in accordance with Embodiment 2. LPF 216 is a movement averaging circuit.

As described above, a fluctuating frequency of output offset typically due to environment change is low frequency almost near a direct current (DC). The angular velocity detection signal also includes extremely low frequency component (e.g., 0.01 Hz). Accordingly, frequency f1 of clock CLK1 of HPF 213 is preferably as low as possible during normal operation in order to reduce the output offset while detecting the angular velocity signal with a low frequency. However, a folding noise is generated in the detection signal if frequency f1 of clock CLK becomes less than two-fold maximum frequency of the band of detection signals. The correction signal is thus distorted and correction section 215 cannot correct it properly. To suppress generation of this folding noise, a pre-processing for limiting the band is executed before the detection signal is input to HPF 213b. For example, if the band of detection signal is 20 Hz, and clock frequency f1 of HPF 213b is 31.25 Hz (8 kHz/256), the band of detection signal is limited to below 15.625 Hz. In this embodiment, the movement averaging circuit is used as LPF 216 for implementing this band limitation. This configuration can limit the band by a small circuit area. The number of movement averages may be set based on frequencies to limit band.

Exemplary Embodiment 4

Figure 13:
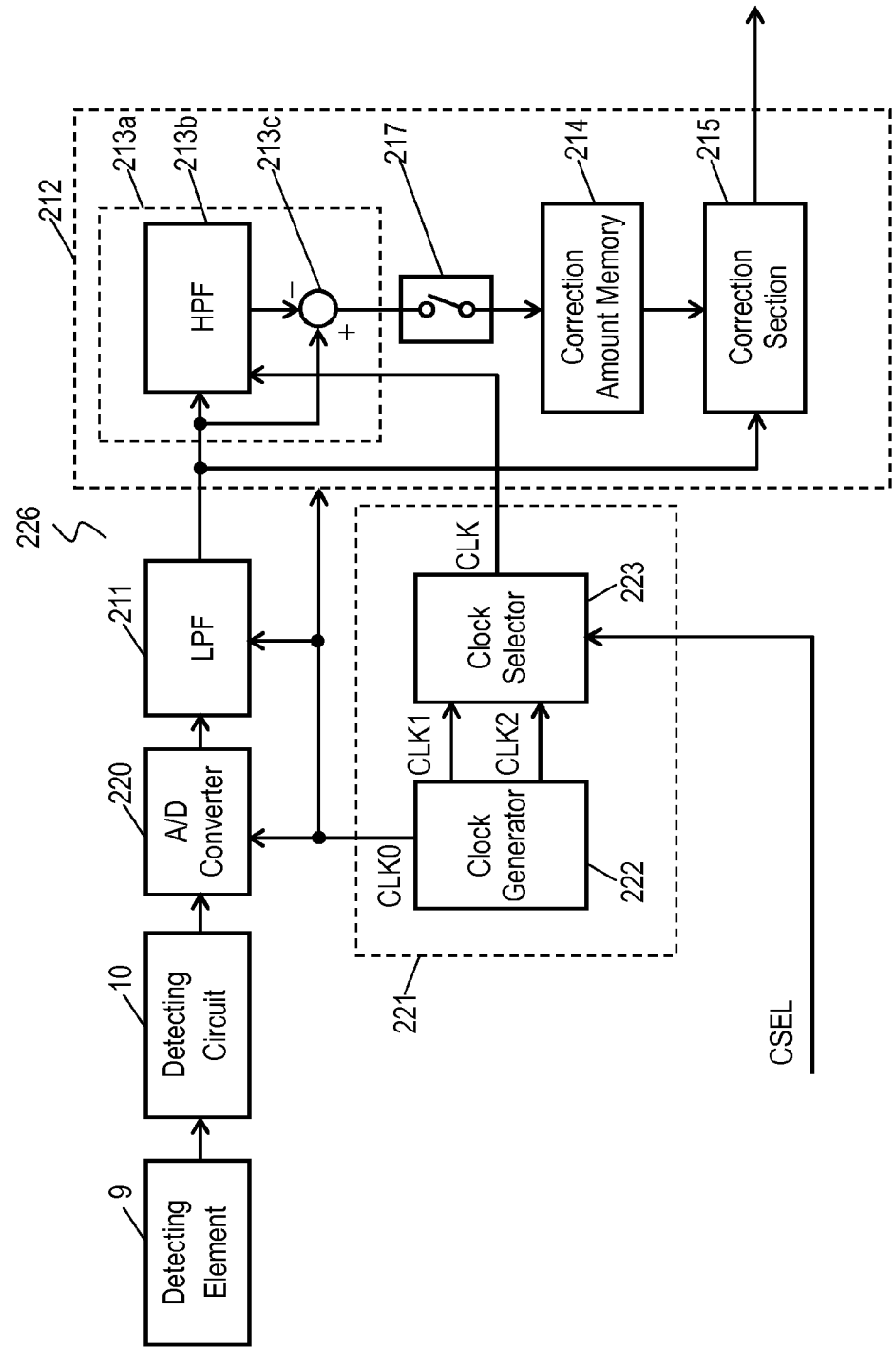
FIG. 13 is a block diagram of an inertial force sensor in accordance with Exemplary Embodiment 4.

FIG. 13 is a block diagram of inertial force sensor 226 in accordance with Exemplary Embodiment 4. In FIG. 13, components identical to those of inertial force sensor 208 in accordance with Embodiment 2 shown in FIG. 8 are denoted by the same reference numerals. Inertial force sensor 226 in accordance with Embodiment 4 shown in FIG. 13 further includes switch circuit 217 connected between processing circuit 213c and correction amount memory 214 of inertial force sensor 208 in accordance with Embodiment 2.

As described above, a pre-processing for limiting the frequency band of detection signals input to HPF 243b is executed if clock frequency f1 of HPF 213a decreases. This configuration increases a processing load on correction circuit 212. Therefore, switch circuit 217 is turned on and off repetitively at a predetermined period to intermittently take in the correction signal to correction amount memory 214 of inertial force sensor 226 in accordance with Embodiment 4. This operation enables correction section 215 to intermittently correct the output offset and decrease cutoff frequency fch of HPF 213b similarly to during the normal operation period. Switch circuit 217 may be connected between correction amount memory 214 and correction section 215. Alternatively, the operation of HPF 213b may be periodically stopped by intermittently stopping clock CLK1 supplied to HPF 213b during the normal operation period.

Exemplary Embodiment 5

Figure 14:
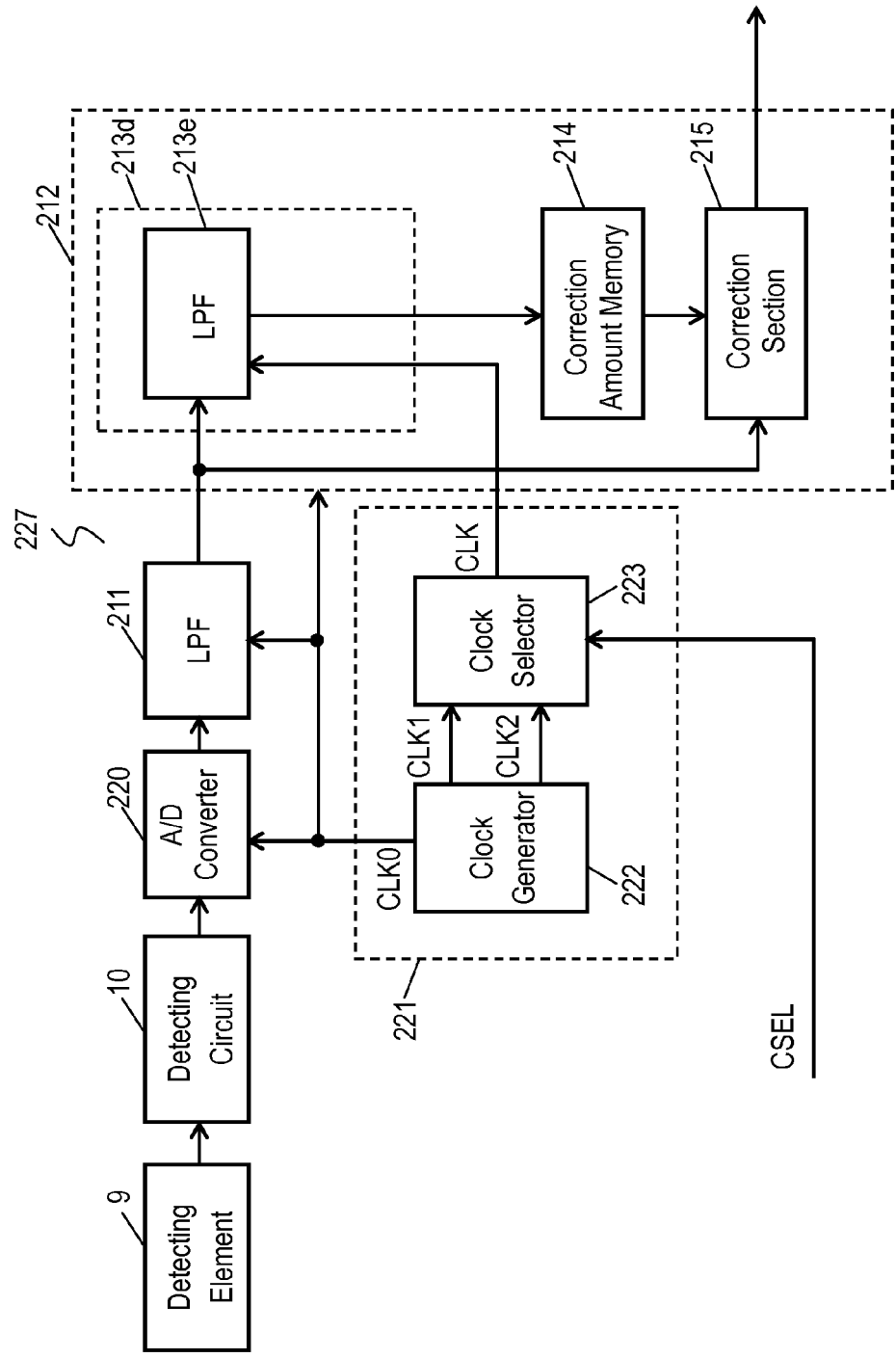
FIG. 14 is a block diagram of an inertial force sensor in accordance with Exemplary Embodiment 5.

FIG. 14 is a block diagram of inertial force sensor 227 in accordance with Exemplary Embodiment 5. In FIG. 14, components identical to those of inertial force sensor 208 in accordance with Embodiment 2 shown in FIG. 8 are denoted by the same reference numerals. Inertial force sensor 227 in accordance with Embodiment 5 shown in FIG. 14 includes correction amount generator 213d instead of correction amount generator 213a of inertial force sensor 208 in accordance with Embodiment 2 shown in FIG. 8.

Correction amount generator 213d includes LPF 213e. The input port of LPF 213e is connected to the output port of LPF 211. The output port of LPF 213e is connected to correction amount memory 214. Similarly to HPF 213a in accordance with Embodiment 2, clock CLK2 having frequency f2, a high frequency, is supplied to LPF 213e from correction start time point is during correction period P0. This operation increases the cutoff frequency of LPF 213. After LPF 213e is converged, LPF 213e is switched to clock CLK1 having low frequency f1. This operation reduces the output offset, and reduces the correction start time. In addition, correction amount generator 213d including LPF 213e allows processing circuit 213c shown in FIG. 8 to be unnecessary. This configuration can reduce circuit area and power consumption. In addition, inertial force sensor 227 in accordance with Embodiment 5 may further include LPF 216 in accordance with Embodiment 3, or switch circuit 217 in accordance with Embodiment 4.

Sixth Exemplary Embodiment

Figure 15:
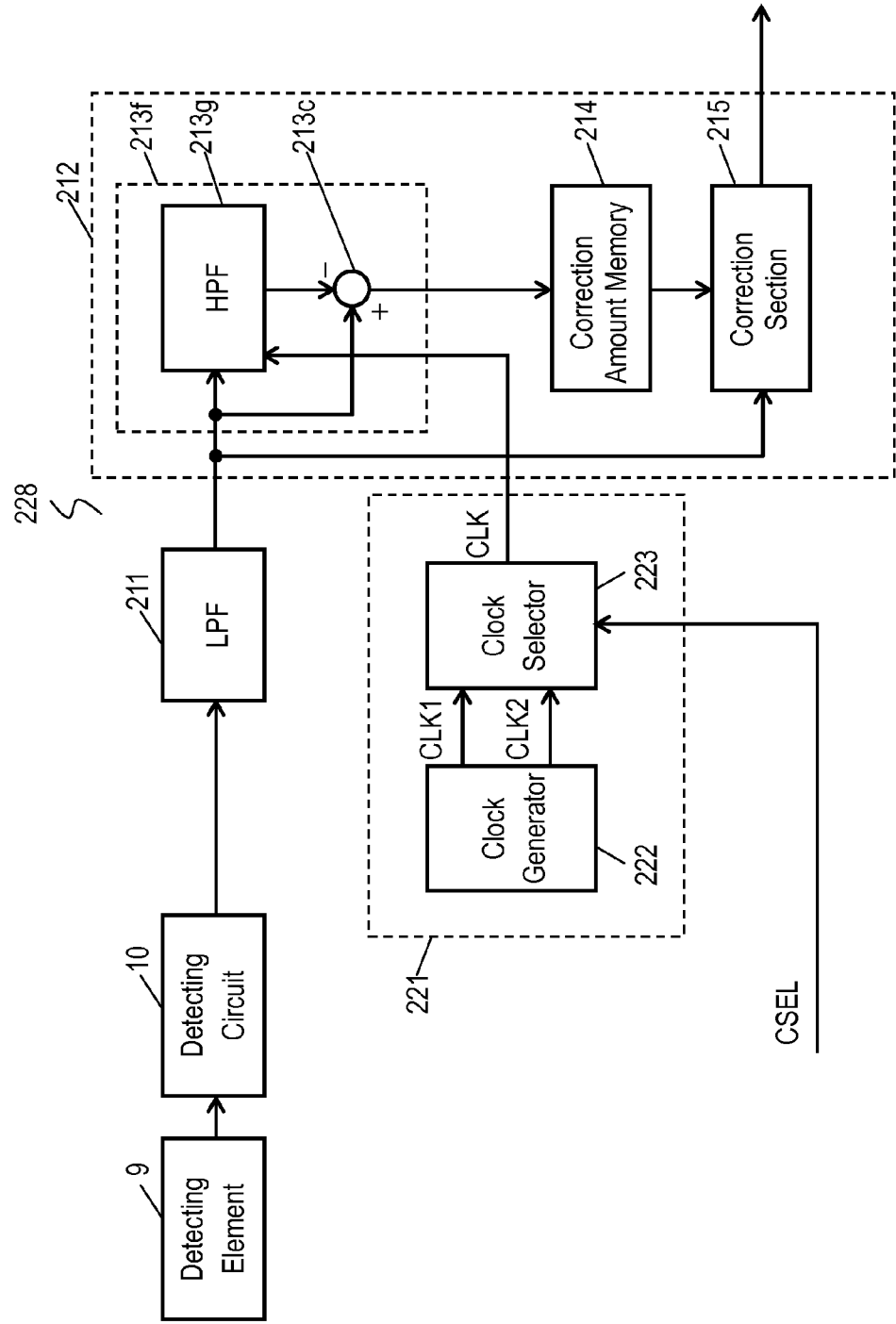
FIG. 15 is a block diagram of an inertial force sensor in accordance with Exemplary Embodiment 6.

FIG. 15 is a block diagram of inertial force sensor 228 in accordance with Exemplary Embodiment 6. In FIG. 15, components identical to those of inertial force sensor 208 in accordance with Embodiment 2 shown in FIG. 8 are denoted by the same reference numerals. Inertial force sensor 228 in accordance with Embodiment 6 shown in FIG. 15 includes correction amount generator 213f instead of correction amount generator 213a and does not include A/D converter 220 pf inertial force sensor 208 in accordance with Embodiment 2.

Correction amount generator 213f includes HPF 213g, which is a discrete filter configured with a capacitor and a switch connected to both ends of the capacitor, instead of HPF 213b in accordance with Embodiment 2.

Figure 16:
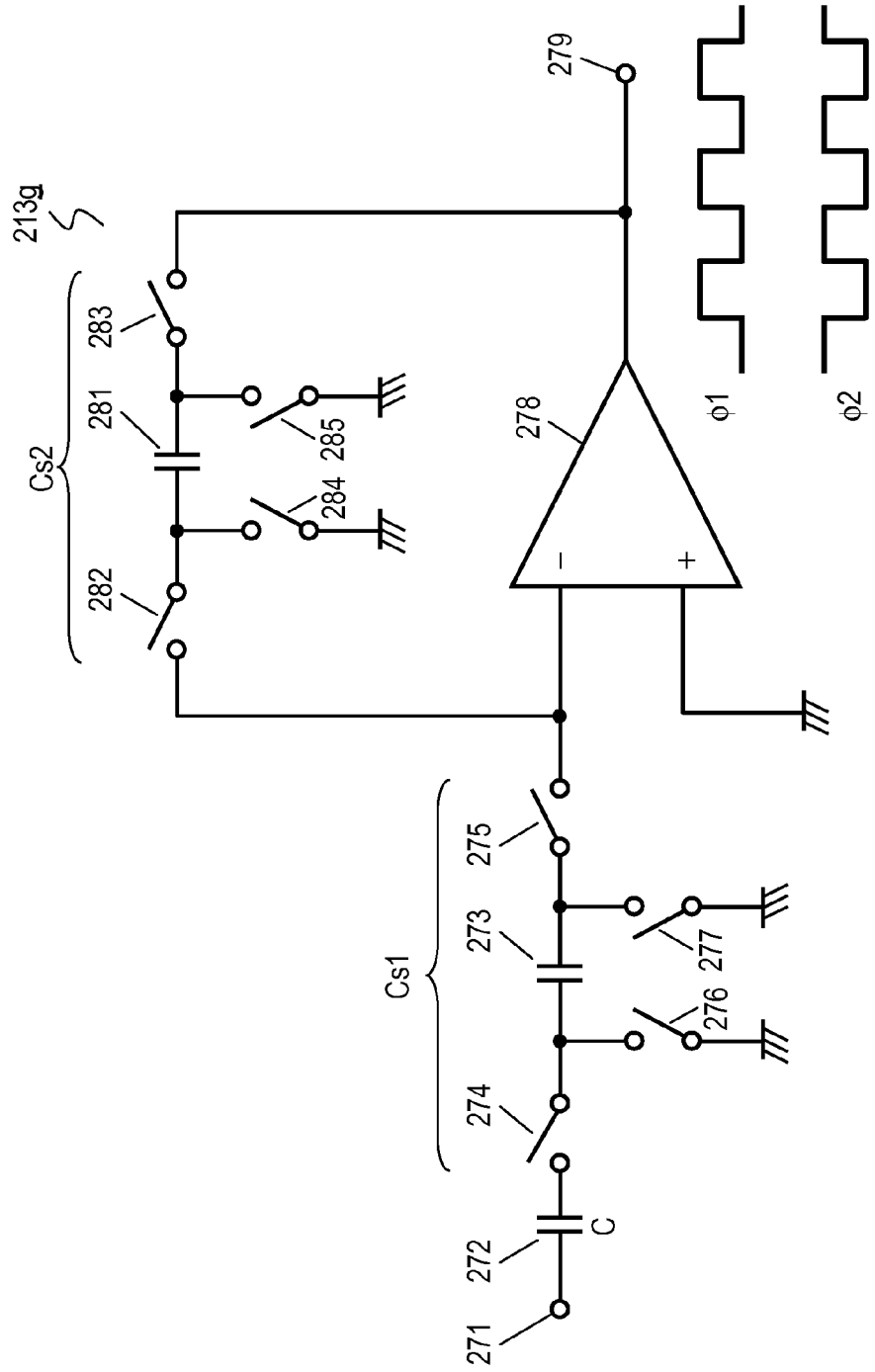
FIG. 16 is a circuit diagram of a high pass filter of the inertial force sensor in accordance with Embodiment 6.

FIG. 16 is a circuit diagram of HPF 213g. HPF 213g includes input terminal 271, capacitors 272, 273, and 281, operation amplifier 278, switches 274, 275, 276, 277, 282, 283, 284, and 285, and output terminal 279. Capacitor 273 and switches 274, 275, 276, and 277 connected to both ends of capacitor 273 constitute switched capacitor Cs1. Capacitor 281 and switches 282, 283, 284, and 285 connected to both ends of capacitor 281 constitute switched capacitor Cs2. Switches 274 and 275 (switches 282 and 283) are turned on and off in response to clock φ1. Switches 276 and 277 (switches 284 and 285) are turned on and off in response to clock φ2. Low-frequency components of the angular velocity detection signal from LPF 211 input to input terminal 271 are cut by HPF 213g, and then output from output terminal 279 to processing circuit 213c. Capacitors 272, 273 and 281 are capacitive elements forming capacitances.

Clocks φ1 and φ2 are output from clock selector 223. These clocks have frequencies identical to as the frequency of clock CLK supplied to the clock input of HPF 213g, and have phases opposite to each other. The cutoff frequency of HPF 213g is determined by a capacitance of capacitor 272, a capacitance of capacitor 273, and frequency f of clock CLK. The cutoff frequency of HPF 213g changes in proportional to frequency f of clock CLK. The cutoff frequency can thus be switched by switching the clock frequency also by using the discrete filter including the switched capacitors in accordance with Embodiment 6. This can reduce the time until filter 213g converges from correction start time point ts. In addition, the entire circuit can be mostly configured with analog circuits, including HPF 213g, in inertial force sensor 228 using the discrete filter including switched capacitors Cs1 and Cs2. The circuit area and power consumption can thus be reduced. Furthermore, inertial force sensor 228 in accordance with Embodiment 6 may further include LPF 216 in accordance with Embodiment 3 shown in FIG. 12, or switch circuit 217 in accordance with Embodiment 4 shown in FIG. 13. Alternatively, LPF 213e in accordance with Embodiment 5 shown in FIG. 14 may be configured with a switched capacitor and an operational amplifier.

As described above, in the inertial force sensors in accordance with Embodiments 2 to 6, the correction amount generator may be implemented by a digital filter or a discrete filter (analog filter) including switched capacitor that operates with a clock. The clock frequency supplied to the correction amount generator is higher only in correction period P0 than in normal operation period P1. This operation reduces the output offset, and provides reliable detection of an inertial force immediately after starting correction.

INDUSTRIAL APPLICABILITY

An inertial force sensor according to the present invention can easily reduce the output offset even if an abrupt change occurs in environment, and is applicable to angular velocity sensors and acceleration sensors employed in input terminals of information communications terminals, such as mobile phones and smartphones; image stabilizers for digital still cameras, navigation systems, and vehicle control systems.

REFERENCE NUMERALS

5 Environment Change Detector
6 Offset Setting Unit
8 Inertial Force Sensor
8A Detecting Unit
9 Detecting Element
10 Detecting Circuit
11 Low Pass Filter
12 Correction section
21 Environment Value Memory
22 Environment Value Difference Calculator
23 Environment Value Comparator
31 Averaging Unit
32 Averaged Signal Memory
33 Difference Calculator
34 Correction Amount Memory
33 Difference Calculator
34 Correction Amount Memory
211 Low Pass Filter (First Filter)
212 Correction Circuit
213a, 213d, 213f Correction Amount Generator
213b, 213g High Pass Filter (Second Filter)
213c Processing Circuit
213e Low Pass Filter (Second Filter)
214 Correction Amount Memory
215 Correction section
216 Low Pass Filter
217 Switch Circuit
220 A/D Converter
222 Clock Generator
223 Clock Selector
273 Capacitive Element
274, 275, 276, 277 Switch
281 Capacitive Element
282, 283, 284, 285 Switch
CLK1 Clock (First Clock)
CLK2 Clock (Second Clock)

The invention claimed is:

1. An inertial force sensor comprising:
a detecting element;
a detecting circuit for detecting an amount of inertia corresponding to an inertial force applied to the detecting element;
an A/D converter for converting an output of the detecting circuit to a digital signal;
a first filter connected to an output port of the A/D converter;
a correction circuit for correcting an output of the first filter;
a clock generator for generating a first clock and a second clock having a frequency higher than a frequency of the first clock; and
a clock selector for selecting and outputting one of the first clock and the second clock,
wherein the correction circuit includes:
a correction amount generator connected to an output of the first filter, the correction amount generator including a second filter having a clock input;
a correction amount memory connected to an output of the correction amount generator; and
a correction section connected to the output of the first filter and an output of the correction amount memory, the correction section correcting an output value of the first filter based on a correction amount stored in the correction amount memory, and
wherein the clock selector is connected to the clock input for selecting the second clock at a time of starting correction, and selecting the first clock after a predetermined time passes from the time of starting correction.

2. The inertial force sensor according to claim 1, further comprising a low pass filter between the first filter and the second filter.

3. The inertial force sensor according to claim 1, further comprising a switch circuit provided between the correction amount generator and the correction section, the switch circuit being intermittently turned on.

4. The inertial force sensor according to claim 1, wherein the clock selector intermittently stops outputting the first clock.

5. The inertial force sensor according to claim 1,
wherein the second filter is a high pass filter, and
wherein the correction amount generator further includes a processing circuit connected to the output port of the first filter and an output port of the second filter for outputting a difference value between the output value of the first filter and an output value of the high pass filter.

6. The inertial force sensor according to claim 1, wherein the second filter is a low pass filter.

7. An inertial force sensor comprising:
a detecting element;
a detecting circuit for detecting an amount of inertia corresponding to an inertial force applied to the detecting element;
a first filter connected to an output port of the detecting circuit;
a correction circuit for correcting an output of the first filter, the correction circuit including:
a correction amount generator connected to an output port of the first filter, the correction amount generator including a second filter having a clock input;
a correction amount memory connected to an output port of the correction amount generator; and a correction section connected to the output port of the first filter and an output port of the correction amount memory, the correction section correcting an output value of the first filter based on a correction amount stored in the correction amount memory;

a clock generator for generating a first clock and a second clock having a frequency higher than a frequency of the first clock; and a clock selector for selecting and outputting one of the first clock and the second clock, wherein the clock selector is connected to the clock input for selecting the second clock at a time of starting correction, and selecting the first clock after a predetermined time passes from the time of starting correction.

8. The inertial force sensor according to claim 7, wherein the second filter is a discrete filter including:

a capacitive element connected to the output port of the first filter; and a switch connected to the capacitive element, the switch being turned on and off based on a clock output from the clock selector.

\* \* \* \* \*